United States Patent
Luo et al.

(10) Patent No.: US 12,466,816 B2
(45) Date of Patent: Nov. 11, 2025

(54) FUSED CYCLIC COMPOUND CAPABLE OF DEGRADING PROTEIN AND USE THEREOF

(71) Applicants: Medshine Discovery Inc., Nanjing (CN); Shanghaitech University, Shanghai (CN)

(72) Inventors: Yunfu Luo, Shanghai (CN); Yong Cang, Shanghai (CN); Bo Peng, Shanghai (CN); Maoyi Lei, Shanghai (CN); Yu Xu, Shanghai (CN); Shuhui Chen, Shanghai (CN)

(73) Assignees: SHANGHAITECH UNIVERSITY, Shanghai (CN); MEDSHINE DISCOVERY INC., Nanjing (CN)

( * ) Notice: Subject to any disclaimer, the term of this patent is extended or adjusted under 35 U.S.C. 154(b) by 913 days.

(21) Appl. No.: 17/641,759

(22) PCT Filed: Sep. 11, 2020

(86) PCT No.: PCT/CN2020/114728
§ 371 (c)(1),
(2) Date: Mar. 9, 2022

(87) PCT Pub. No.: WO2021/047627
PCT Pub. Date: Mar. 18, 2021

(65) Prior Publication Data
US 2022/0324848 A1     Oct. 13, 2022

(30) Foreign Application Priority Data
Sep. 12, 2019  (CN) .......................... 201910865744.2

(51) Int. Cl.
*C07D 405/04* (2006.01)
*C07D 405/14* (2006.01)
*C07D 413/04* (2006.01)

(52) U.S. Cl.
CPC ......... *C07D 405/04* (2013.01); *C07D 405/14* (2013.01); *C07D 413/04* (2013.01)

(58) Field of Classification Search
CPC .................................................... C07D 405/04
See application file for complete search history.

(56) References Cited

U.S. PATENT DOCUMENTS

| | | |
|---|---|---|
| 2015/0291562 A1 | 10/2015 | Crew et al. |
| 2017/0121321 A1 | 5/2017 | Crews et al. |

FOREIGN PATENT DOCUMENTS

| | | |
|---|---|---|
| CN | 106458993 A | 2/2017 |
| CN | 108366992 A | 8/2018 |
| CN | 109641874 A | 4/2019 |
| WO | WO-2015200795 A1 | 12/2015 |
| WO | WO-2016057503 A1 | 4/2016 |
| WO | WO-2017120446 A1 | 7/2017 |
| WO | WO-2018208123 A1 | 11/2018 |

*Primary Examiner* — Golam M Shameem
(74) *Attorney, Agent, or Firm* — FENWICK & WEST LLP; Ethan D. Decicco

(57) ABSTRACT

The present disclosure discloses a compound shown in formula (II) and a pharmaceutically acceptable salt thereof or a pharmaceutical composition comprising the compound as an active ingredient, and use thereof in the preparation of medicaments for protein degradation.

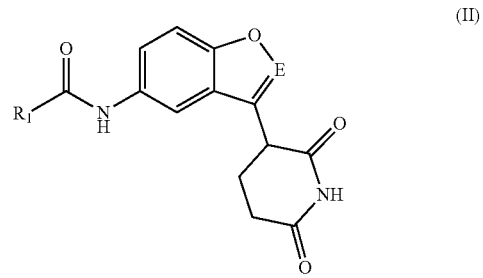

(II)

Figure 1:
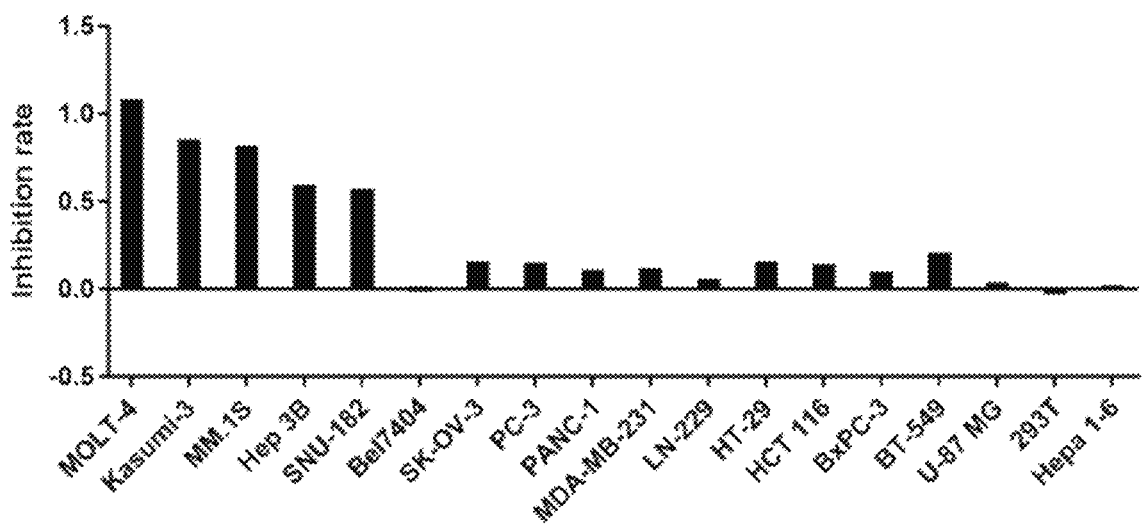

11 Claims, 10 Drawing Sheets
Specification includes a Sequence Listing.

FUSED CYCLIC COMPOUND CAPABLE OF DEGRADING PROTEIN AND USE THEREOF

RELATED APPLICATIONS

This application is a U.S. National Phase Application, filed under 35 U.S.C. § 371, of International Application No. PCT/CN2020/114728, filed on Sep. 11, 2020, which claims priority to, and the benefit of, Chinese Application No. CN201910865744.2, filed on Sep. 12, 2019. The contents of each of the aforementioned patent applications are incorporated herein by reference in their entireties.

SEQUENCE LISTING

The instant application contains a Sequence Listing which has been submitted in ASCII format via Patent Center and is hereby incorporated by reference in its entirety. The ASCII copy, created on Jul. 28, 2025, is named "DETH-003_N01US_SeqList_ST25.txt" and is 1,679 bytes in size.

TECHNICAL FIELD

The present disclosure relates to a compound shown in formula (II) and a pharmaceutically acceptable salt thereof or a pharmaceutical composition comprising the compound as an active ingredient, and use thereof in the preparation of medicaments for protein degradation.

BACKGROUND ART

Through the slotting of a glutarimide ring structure into the pocket of the Cereblon (CRBN) ubiquitin ligase, immunomodulatory drugs including thalidomide, lenalidomide (Lena), and pomalidomide (Poma) recruit the transcription factors Ikaros (IKZF1)/Aiolos (IKZF3) on which B cell-derived cancer cells depend for survival, and promote their ubiquitin-mediated degradation, resulting in cytotoxic effects. In addition to mediating the ubiquitination and degradation of IKZF1/3, lenalidomide is also capable of mediating the degradation of CK1alpha by targeting CRBN, for the treatment of myelodysplastic syndrome with isolated 5q deletion.

As an important target of anti-tumor and immunomodulatory drugs, CRBN has been proven to have clear curative effect in multiple myeloma, chronic lymphocytic leukemia and many other hematological malignancies, skin diseases such as leprosy and erythema nodosum, and autoimmune diseases such as systemic lupus erythematosus. CRBN plays a critical role in the ubiquitin-proteasome system. There is an urgent need to develop novel CRBN modulators to target new substrate proteins for potential treatment of different diseases.

SUMMARY OF THE INVENTION

To discover more similar "molecular glues" targeting CRBN, a research and development process for such anti-tumor compounds has been developed in the present disclosure, which mainly includes the following steps: 1) synthesis of compound libraries containing glutarimide structural fragments; 2) screening of cytotoxic compounds; 3) further screening of compounds dependent on CRBN to exert cytotoxicity; 4) use of mass spectrometry to find potential target proteins of the compounds; and 5) conduct of mechanism and preclinical research.

A large number of compounds were evaluated based on the above process. The compound WX106 was found to promote Wee1 kinase ubiquitination and proteasome-mediated degradation. Wee1 is an important G2-M checkpoint regulatory protein and a potential target of tumor-targeted drugs. Inhibition of Wee1 in tumor cells impairs the G2-M checkpoint, causing the genome to enter mitosis in a damaged state, leading to tumor cell apoptosis, i.e., a mitotic catastrophe. A series of preclinical and clinical studies have demonstrated that Wee1 inhibitors have a good inhibitory effect on G1-S checkpoint-deficient tumor cells, and Wee1 is capable of enhancing the sensitivity of many DNA-damaging agents.

Through targeted synthesis of compound libraries, combined with phenotypic screening and protein degradation-based mass spectrometry analysis, new molecular glue compounds targeting new substrate proteins can be efficiently discovered for ubiquitination and proteasome-mediated degradation of the new substrate proteins, thereby serving as potential treatments for a variety of diseases.

The present disclosure provides a compound represented by formula (II) or a pharmaceutically acceptable salt thereof,

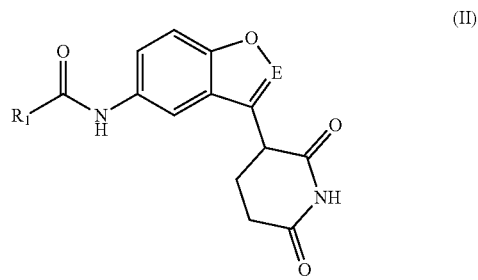

(II)

wherein,
E is selected from CH and N;
$R_1$ is selected from $C_{1-4}$ alkyl, $C_{2-3}$ alkenyl,

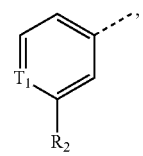

cyclopropyl and furyl, wherein the $C_{1-4}$ alkyl and $C_{2-3}$ alkenyl may be optionally substituted with 1, 2, or 3 $R_a$;
$T_1$ is selected from $C(R_3)$ and N;
$R_2$ is selected from H, F, Cl, Br, I, $CH_3$ and $CF_3$;
$R_3$ is selected from H, F, Cl, Br, I and $CH_3$, wherein the $CH_3$ may be optionally substituted with 1, 2 or 3 halogens; each $R_a$ is selected from halogens, $OCH_3$ and $NH_2$;

In some embodiments of the present disclosure, the $R_2$ is selected from H, Cl and $CF_3$, while other variables are as defined herein.

In some embodiments of the present disclosure, the $R_2$ is Cl, while other variables are as defined herein.

In some embodiments of the present disclosure, the $R_3$ is selected from H, F, Cl, Br, I and $CH_3$, wherein the $CH_3$ may be optionally substituted with 1, 2 or 3 F, while other variables are as defined herein.

In some embodiments of the present disclosure, the $R_3$ is selected from H, F, Cl, Br, I and $CH_3$, while other variables are as defined herein.

In some embodiments of the present disclosure, the $R_3$ is H and $CH_3$, while other variables are as defined herein.

In some embodiments of the present disclosure, the $R_1$ is selected from

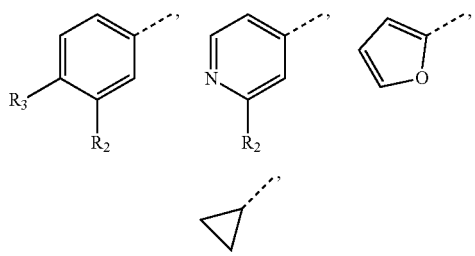

$CH=CH_2$, $CH_3$, $CH_2CH_3$ and $CH_2CH_2CH_3$, wherein the $CH_3$, $CH_2CH_3$ and $CH_2CH_2CH_3$ may be optionally substituted with 1, 2 or 3 $R_a$, while other variables are as defined herein.

In some embodiments of the present disclosure, the $R_1$ is selected from

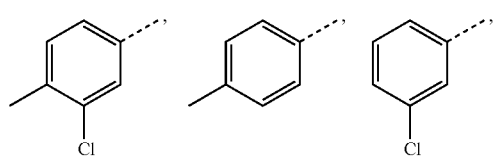

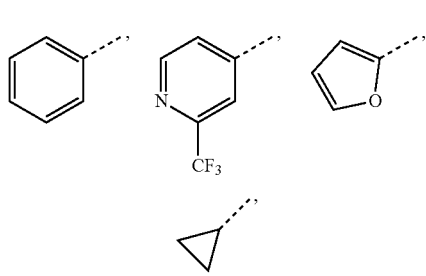

—$CH=CH_2$, —$CH_2NH_2$, —$CH_2CH_3$, —$CH_2CH_2OCH_3$ and —$CH_2CH_2CH_3$, while other variables are as defined herein.

The present disclosure provides a compound represented by formula (I) or a pharmaceutically acceptable salt thereof,

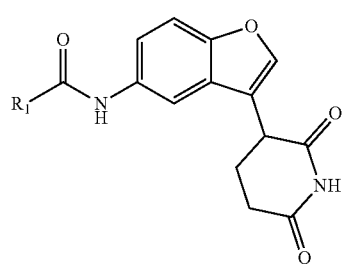

(I)

wherein,
$R_1$ is selected from $C_{2-4}$ alkyl and

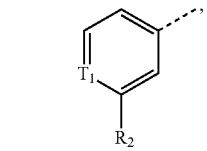

wherein the $C_{2-4}$ alkyl may be optionally substituted with 1, 2 or 3 halogens;
$T_1$ is selected from $C(R_3)$ and N;
$R_2$ is selected from H, F, Cl, Br, I, $CH_3$ and $CF_3$;
$R_3$ is selected from H, F, Cl, Br, I and $CH_3$, wherein $CH_3$ may be optionally substituted with 1, 2 or 3 halogens.

In some embodiments of the present disclosure, the $R_2$ is selected from H, Cl and $CF_3$, while other variables are as defined herein.

In some embodiments of the present disclosure, the $R_2$ is Cl, while other variables are as defined herein.

In some embodiments of the present disclosure, the $R_3$ is selected from H, F, Cl, Br, I and $CH_3$, wherein the $CH_3$ may be optionally substituted with 1, 2 or 3 F, while other variables are as defined herein.

In some embodiments of the present disclosure, the $R_3$ is selected from H, F, Cl, Br, I and $CH_3$, while other variables are as defined herein.

In some embodiments of the present disclosure, the $R_3$ is $CH_3$, while other variables are as defined herein.

In some embodiments of the present disclosure, the $R_1$ is selected from

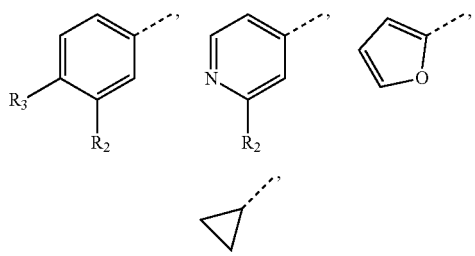

and $C_{3-4}$ alkyl, wherein the $C_{3-4}$ alkyl may be optionally substituted with 1, 2 or 3 F, while other variables are as defined herein.

In some embodiments of the present disclosure, the $R_1$ is selected from

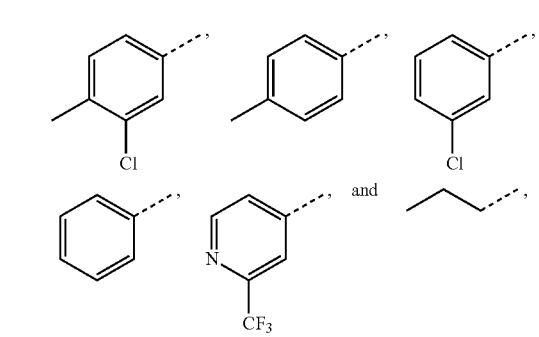

while other variables are as defined herein.

In some embodiments of the present disclosure, the compound or a pharmaceutically acceptable salt thereof, is selected from

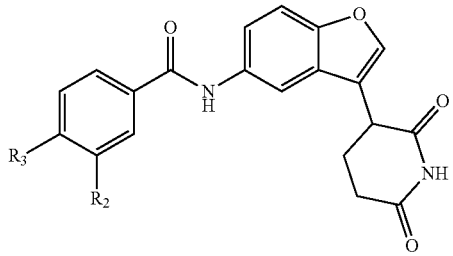
(I-1)
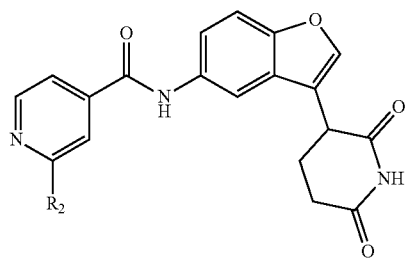
(I-2)
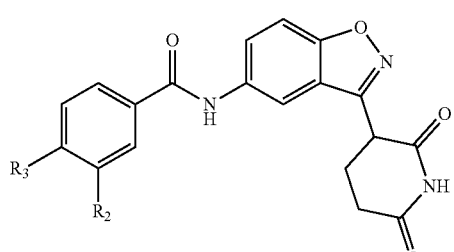
(II-1)
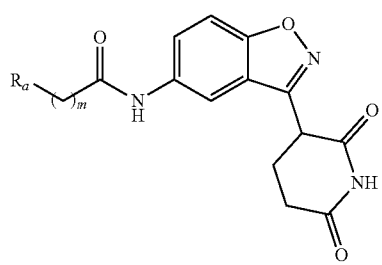
(II-2)
wherein, m is selected from 1, 2 and 3; while $R_2$, $R_3$ and $R_a$ are as defined herein.
The present disclosure provides a compound of the following formula or a pharmaceutically acceptable salt thereof, which is selected from
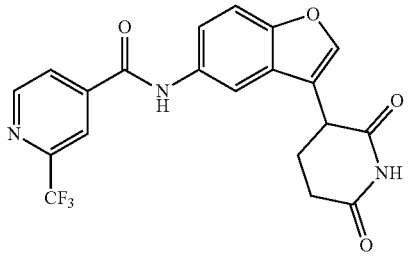
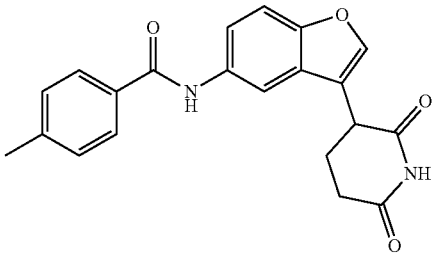
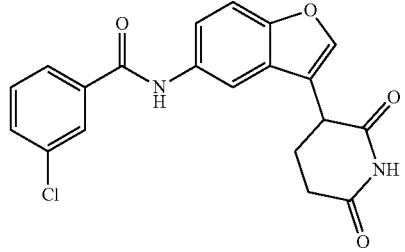
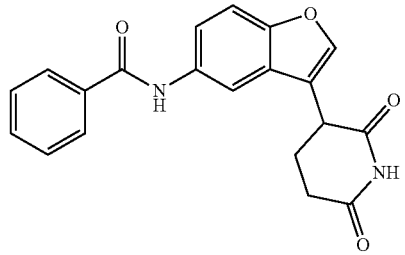
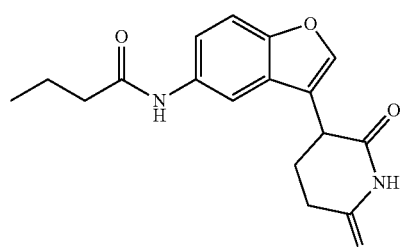
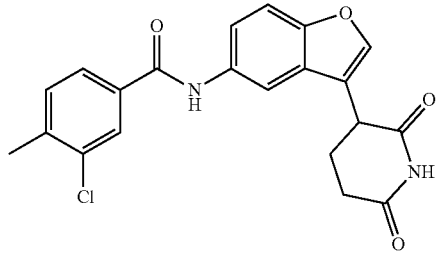
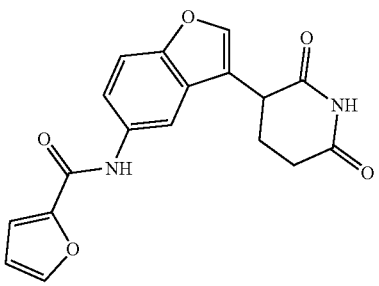

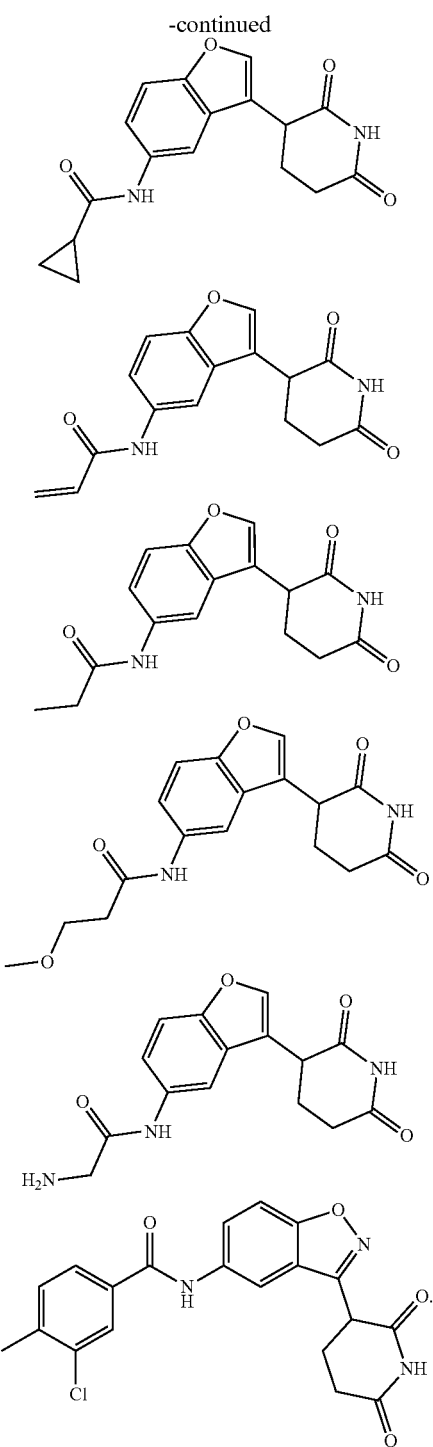

There are also some solutions of the present disclosure that are obtained by any combination of the above variables.

The present disclosure provides a composition comprising a therapeutically effective amount of the above compound or a pharmaceutically acceptable salt thereof as an active ingredient and a pharmaceutically acceptable carrier.

The present disclosure provides the use of the above compound or a pharmaceutically acceptable salt or composition thereof in the preparation of medicaments for protein degradation.

The present disclosure provides the use of the above compound or a pharmaceutically acceptable salt or composition thereof in the preparation of medicaments for Wee1 protein degradation.

The present disclosure provides the use of the above compound or a pharmaceutically acceptable salt or composition 4 thereof in the preparation of medicaments for CRL4 (CRBN)-mediated Wee1 protein degradation.

Definitions and Descriptions

Unless otherwise specified, the following terms and phrases used herein are intended to have the following meanings. A particular term or phrase should not be considered indeterminate or unclear unless specifically defined, but should be understood in its ordinary meaning. When a trade name appears herein, it is intended to refer to its corresponding commercial product or its active ingredient.

The term "pharmaceutically acceptable" is used herein for those compounds, materials, compositions, and/or dosage forms which are, within the scope of sound medical judgment, suitable for use in contact with the tissues of human beings and animals without excessive toxicity, irritation, allergic response, or other problems or complications, and commensurate with a reasonable benefit/risk ratio.

The term "pharmaceutically acceptable salt" refers to a salt of the compound disclosed herein, which is prepared from the compound having particular substituents disclosed herein and a relatively non-toxic acid or base. When the compound of the present disclosure contains a relatively acidic functional group, a base addition salt may be obtained by contacting the neutral form of such a compound with a sufficient amount of a base in a pure solution or a suitable inert solvent. Pharmaceutically acceptable base addition salts include sodium, potassium, calcium, ammonium, organic amine or magnesium salts, or similar salts. When the compound of the present disclosure contains a relatively basic functional group, an acid addition salt may be obtained by contacting the neutral form of such a compound with a sufficient amount of an acid in a pure solution or a suitable inert solvent. Examples of pharmaceutically acceptable acid addition salts include salts derived from inorganic acids, such as hydrochloric acid, hydrobromic acid, nitric acid, carbonic acid, bicarbonate, phosphoric acid, monohydrogen phosphate, dihydrogen phosphate, sulfuric acid, hydrogen sulfate, hydroiodic acid and phosphorous acid; and salts derived from organic acids, such as acetic acid, propionic acid, isobutyric acid, maleic acid, malonic acid, benzoic acid, succinic acid, suberic acid, fumaric acid, lactic acid, mandelic acid, phthalic acid, benzenesulfonic acid, p-toluenesulfonic acid, citric acid, tartaric acid and methanesulfonic acid; and also include salts of amino acids (such as arginine), and salts of organic acids such as glucuronic acid. Certain specific compounds disclosed herein contain both basic and acidic functional groups that allow the compounds to be converted into either base or acid addition salts.

The pharmaceutically acceptable salts of the present disclosure may be synthesized from a parent compound containing acid radicals or bases by means of conventional chemical methods. In general, such salts are prepared by the following method: the free acid or base form of the compound reacting with a stoichiometric amount of the appropriate base or acid in water or an organic solvent or a mixture thereof.

The compound of the present disclosure may have a specific geometric or stereoisomeric form. All such compounds are contemplated herein, including cis and trans isomers, (−)- and (+)-enantiomers, (R)- and (S)-enantiomers, diastereoisomers, (D)-isomers, (L)-isomers, and racemic mixtures and other mixtures thereof, such as enantiomer or diastereoisomer enriched mixtures, all of which are encompassed within the scope of the present disclosure. Substituents such as alkyl may have an additional asymmetric carbon atom. All these isomers and mixtures thereof are encompassed within the scope of the present disclosure.

Unless otherwise stated, the term "enantiomer" or "optical isomer" refers to stereoisomers that are mirror images of each other.

Unless otherwise stated, the term "cis-trans isomer" or "geometric isomer" results from the inability of a single bond of a ring carbon atom or a double bond to rotate freely.

Unless otherwise stated, the term "diastereoisomer" refers to stereoisomers in which molecules each have two or more chiral centers and are not mirror images of each other.

Unless otherwise stated, "(D)" or "(+)" stands for dextrorotation, "(L)" or "(−)" stands for levorotation, and "(DL)" or "(±)" stands for racemization.

Unless otherwise stated, the absolute configuration of a stereogenic center is represented by a wedged solid bond (⟋) and a wedged dashed bond (⟋) and the relative configuration of a stereogenic center is represented by a straight solid bond (⟋) and a straight dashed bond (⟋). A wavy line (⟋) represents a wedged solid bond (⟋) or a wedged dashed bond (⟋), or a wavy line (⟋) represents a straight solid bond (⟋) or a straight dashed bond (⟋).

The compounds disclosed herein may be present in particular form. Unless otherwise stated, the term "tautomer" or "tautomeric form" means that different functional isomers are in dynamic equilibrium at room temperature and may be rapidly converted into each other. Where tautomerization is possible (e.g., in solution), the chemical equilibrium of tautomers may be achieved. For example, a proton tautomer (also known as a prototropic tautomer) includes the interconversion by proton transfer, such as keto-enol isomerization and imine-enamine isomerization. A valence isomer includes the interconversion by recombination of some bonding electrons. A specific example of the keto-enol tautomerization is the interconversion between tautomers pentane-2,4-dione and 4-hydroxypent-3-en-2-one.

Unless otherwise stated, the term "enriched with one isomer", "isomer enriched", "enriched with one enantiomer", or "enantiomer enriched" means that the content of one of the isomers or enantiomers is less than 100% and more than or equal to 60%, 70%, 80%, 90%, 95%, 96%, 97%, 98%, 99%, 99.5%, 99.6%, 99.7%, 99.8%, or 99.9%.

Unless otherwise stated, the term "isomeric excess" or "enantiomeric excess" refers to the difference between the relative percentages of two isomers or enantiomers. For example, if the content of one isomer or enantiomer is 90% and the content of the other isomer or enantiomer is 10%, the isomeric or enantiomeric excess (ee value) is 80%.

Optically active (R)- and (S)-isomers and D and L isomers may be prepared by chiral synthesis or chiral reagents or other conventional techniques. If one kind of enantiomer of certain compound disclosed herein is to be obtained, the desired pure enantiomer may be prepared by asymmetric synthesis or derivatization using a chiral auxiliary, wherein the resulting diastereoisomeric mixture is separated and the auxiliary group is cleaved. Alternatively, when the molecule contains a basic functional group (such as amino) or an acidic functional group (such as carboxyl), the compound reacts with an appropriate optically active acid or base to form a salt of the diastereoisomer, which is then subjected to diastereoisomeric resolution through conventional methods in the art to get the pure enantiomer. Furthermore, the enantiomer and the diastereoisomer are generally isolated through chromatography using a chiral stationary phase, optionally in combination with chemical derivatization (e.g., carbamate generated from amine).

The compound disclosed herein may contain an unnatural proportion of atomic isotope at one or more of the atoms that constitute the compound. For example, the compound may be labeled with a radioisotope, such as tritium ($^3H$), iodine-125 ($^{125}I$), or C-14 ($^{14}C$). Citing another example, hydrogen may be substituted by deuterium to form a deuterated drug, and the bond formed by deuterium and carbon is firmer than that formed by common hydrogen and carbon. Compared with an un-deuterated drug, the deuterated drug has the advantages of reduced toxic side effect, increased stability, enhanced efficacy, prolonged biological half-life and the like. All isotopic variations of the compound described herein, whether radioactive or not, are encompassed within the scope of the present disclosure.

"Optional" or "optionally" means that the subsequently described event or circumstance may, but not necessarily, occur, and the description includes instances where the event or circumstance occurs and instances where it does not.

The term "substituted" means that one or more hydrogen atoms on a specific atom are substituted by substituent(s) which may include deuterium and hydrogen variants, as long as the valence of the specific atom is normal and the substituted compound is stable. When the substituent is an oxygen (i.e., =O), it means that two hydrogen atoms are substituted. Substitution by oxygen does not occur on aromatic groups. The term "optionally substituted" means that an atom may or may not be substituted. Unless otherwise specified, the type and number of the substituents may be arbitrary as long as being chemically achievable.

When any variable (e.g., R) occurs more than once in the constitution or structure of a compound, the definition of the variable in each case is independent. Thus, for example, if a group is substituted by 0-2 R, the group may be optionally substituted by two R at most, and the definition of R in each case is independent. Furthermore, a combination of a substituent and/or a variant thereof is permissible only if the combination can result in a stable compound.

When the number of a linking group is 0, such as —(CRR)$_0$—, it means that the linking group is a single bond.

When one of the variables is selected from a single bond, it means that the two groups to which it is connected are directly connected. For example, when L represents a single bond in A-L-Z, it means that the structure is actually A-Z.

When a substituent is vacant, it means that the substituent does not exist. For example, when X is vacant in A-X, it means that the structure is actually A.

Unless otherwise stated, $C_{n-n+m}$ or $C_n$-$C_{n+m}$ includes any one of the specific cases of n to n+m carbon atoms. For example, $C_{1-12}$ includes $C_1$, $C_2$, $C_3$, $C_4$, $C_5$, $C_6$, $C_7$, $C_8$, $C_9$, $C_{10}$, $C_{11}$ and $C_{12}$. Also, any range within n to n+m may be included. For example, $C_{1-12}$ includes $C_{1-3}$, $C_{1-6}$, $C_{1-9}$, $C_{3-6}$, $C_{3-9}$, $C_{3-12}$, $C_{6-9}$, $C_{6-12}$ and $C_{9-12}$, etc. Similarly, n–n+m membered means that the number of atoms on the ring is n to n+m. For example, 3-12 membered ring includes 3 membered ring, 4 membered ring, 5 membered ring, 6 membered ring, 7 membered ring, 8 membered ring, 9 membered ring, 10 membered ring, 11 membered ring and 12 membered ring. n–n+m membered also represents any range within n to n+m. For example, 3-12 membered ring includes 3-6 membered ring, 3-9 membered ring, 5-6 membered ring, 5-7 membered ring, 6-7 membered ring, 6-8 membered ring, 6-10 membered ring, etc.

Unless otherwise stated, the term "$C_{1-4}$ alkyl" refers to a linear or branched saturated hydrocarbon group consisting of 1 to 4 carbon atoms. The $C_{1-4}$ alkyl includes $C_{1-2}$, $C_{1-3}$, and $C_{2-3}$ alkyl, etc., and may be monovalent (e.g., methyl), divalent (e.g., methylene), or polyvalent (e.g., methenyl). Examples of $C_{1-4}$ alkyl include, but are not limited to, methyl (Me), ethyl (Et), propyl (including n-propyl and isopropyl), butyl (including n-butyl, isobutyl, s-butyl, and t-butyl), and the like.

Unless otherwise stated, the term "$C_{2-4}$ alkyl" refers to a linear or branched saturated hydrocarbon group consisting of 2 to 4 carbon atoms. The $C_{2-4}$ alkyl includes $C_{2-3}$ and $C_{3-4}$ alkyl, etc., and may be monovalent (e.g., ethyl), divalent (e.g., ethylidene), or polyvalent (e.g., ethylene). Examples of $C_{2-4}$ alkyl include, but are not limited to, ethyl (Et), propyl (including n-propyl and isopropyl), butyl (including n-butyl, isobutyl, s-butyl, and t-butyl), and the like.

Unless otherwise stated, the term "$C_{3-4}$ alkyl" refers to a linear or branched saturated hydrocarbon group consisting of 3 to 4 carbon atoms. The $C_{3-4}$ alkyl includes $C_3$ and $C_4$ alkyl, etc., and may be monovalent (e.g., propyl), divalent (e.g., propylene), or polyvalent (e.g., hypopropyl). Examples of $C_{3-4}$ alkyl include, but are not limited to, propyl (including n-propyl and isopropyl), butyl (including n-butyl, isobutyl, s-butyl, and t-butyl), and the like.

Unless otherwise stated, "$C_{2-3}$ alkenyl" is used to represent a straight-chained or branched-chain hydrocarbon group consisting of 2 to 3 carbon atoms containing at least one carbon-carbon double bond, which may be located anywhere in the group. The $C_{2-3}$ alkenyl includes $C_3$ and $C_2$ alkenyls; the $C_{2-3}$ alkenyl may be monovalent, divalent or polyvalent. Examples of $C_{2-3}$ alkenyl include, but are not limited to, vinyl, propenyl, and the like.

The term "halo" or "halogen," by itself or as part of another substituent, means, unless otherwise stated, a fluorine, chlorine, bromine, or iodine atom. Furthermore, the term "haloalkyl" is meant to include monohaloalkyl and polyhaloalkyl. For example, the term "halo($C_1$-$C_4$)alkyl" is meant to include, but not be limited to, trifluoromethyl, 2,2,2-trifluoroethyl, 4-chlorobutyl, 3-bromopropyl, and the like. Unless otherwise stated, examples of haloalkyl include, but are not limited to, trifluoromethyl, trichloromethyl, pentafluoroethyl, and pentachloroethyl.

The term "leaving group" refers to a functional group or atom which may be displaced by another functional group or atom in a substitution reaction (e.g., a nucleophilic substitution reaction). For example, representative leaving groups include triflate; chlorine, bromine and iodine; sulfonate group, such as mesylate, tosylate, p-bromobenzenesulfonate, p-toluenesulfonates and the like; acyloxy, such as acetoxy, trifluoroacetoxy and the like.

The term "protecting group" includes, but is not limited to "amino protecting group", "hydroxy protecting group" or "mercapto protecting group". The term "amino protecting group" refers to a protecting group suitable for blocking the side reaction on the nitrogen of an amino. Representative amino protecting groups include, but are not limited to: formyl; acyl, such as alkanoyl (e.g. acetyl, trichloroacetyl or trifluoroacetyl); alkoxycarbonyl, such as tert-butoxycarbonyl (Boc); arylmethoxycarbonyl, such as benzyloxycarbonyl (Cbz) and 9-fluorenylmethoxycarbonyl (Fmoc); arylmethyl, such as benzyl (Bn), trityl (Tr), 1,1-bis-(4'-methoxyphenyl)methyl; silyl, such as trimethylsilyl (TMS) and tertbutyldimethylsilyl (TBS) and the like. The term "hydroxy protecting group" refers to a protecting group suitable for blocking the side reaction on hydroxy. Representative hydroxy protecting groups include, but are not limited to: alkyl, such as methyl, ethyl and tert-butyl; acyl, such as alkanoyl (e.g. acetyl); arylmethyl, such as benzyl (Bn), p-methoxybenzyl (PMB), 9-fluorenylmethyl (Fm), and diphenylmethyl (benzhydryl, DPM); silyl, such as trimethylsilyl (TMS) and tertbutyldimethylsilyl (TBS) and the like.

The compound of the present disclosure may be prepared by a variety of synthetic methods well known to those skilled in the art, including the following enumerative embodiment, the embodiment formed by the following enumerative embodiment in combination with other chemical synthesis methods and the equivalent replacement well known to those skilled in the art. The preferred embodiment includes, but is not limited to the embodiment of the present disclosure.

The structure of the compound of the present disclosure may be confirmed by conventional methods well known to those skilled in the art, and if the present disclosure relates to the absolute configuration of the compound, the absolute configuration may be confirmed by conventional technical means in the art. For example, single crystal X-ray diffraction (SXRD) may be used, wherein a cultured single crystal is analyzed by a Bruker D8 Venture diffractometer to collect diffraction intensity data, and the light source is CuKα radiation, and the scanning mode is φ/ω scanning; and after relevant data are collected, the crystal structure is further analyzed by using a direct method (Shelxs97), so that the absolute configuration can be confirmed.

The compound of the present disclosure may have a variety of uses or indications, including but not limited to the specific uses or indications recited in this application.

The solvents used in the present disclosure are commercially available. The present disclosure uses the following abbreviations: aq represents water; HATU represents O-(7-azabenzotriazol-1-yl)-N,N,N',N'-tetramethyluronium hexafluorophosphate; EDC represents N-(3-dimethylaminopropyl)-N'-ethylcarbodiimide hydrochloride; m-CPBA represents 3-chloroperoxybenzoic acid; eq represents equivalent; M represents mol/L; CDI represents carbonyldiimidazole; DCM represents dichloromethane; PE represents petroleum ether; DIAD represents diisopropyl azodicarboxylate; DMF represents N,N-dimethylformamide; DMSO represents dimethyl sulfoxide; EtOAc represents ethyl acetate; EtOH represents ethanol; MeOH represents methanol; CBz represents benzyloxycarbonyl, which is an amine protecting group; BOC represents tert-butoxycarbonyl, which is an amine protecting group; HOAc represents acetic acid; acetonitrile (ACN) $BH_3$ represents sodium cyanoborohydride; r.t. represents room temperature; O/N represents overnight; THF represents tetrahydrofuran; $Boc_2O$ represents di-tert-butyl dicarbonate; TFA represents trifluoroacetic acid; DIPEA represents diisopropylethylamine; $SOCl_2$ represents thionyl chloride; $CS_2$ represents carbon disulfide; TsOH represents p-toluenesulfonic acid; NFSI represents N-fluoro-N-(benzenesulfonyl)benzenesulfonamide; NCS represents 1-chloropyrrolidine-2,5-dione; n-$Bu_4NF$ represents tetrabutylammonium fluoride; iPrOH represents 2-propanol; mp represents melting point; and LDA represents lithium diisopropylamide. BSA represents bovine serum albumin; the structure of CC885 is

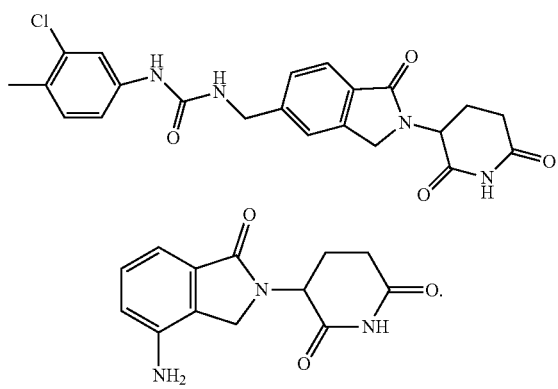

Compounds are named according to conventional nomenclature in the art or using ChemDraw® software, and supplier's catalog names are adopted for commercially available compounds.

Technical Effect

The compound of the present disclosure demonstrated significant down-regulation of Wee1 protein levels in MOLT-4 cells.

DESCRIPTION OF ATTACHED DRAWINGS

Figure 2:
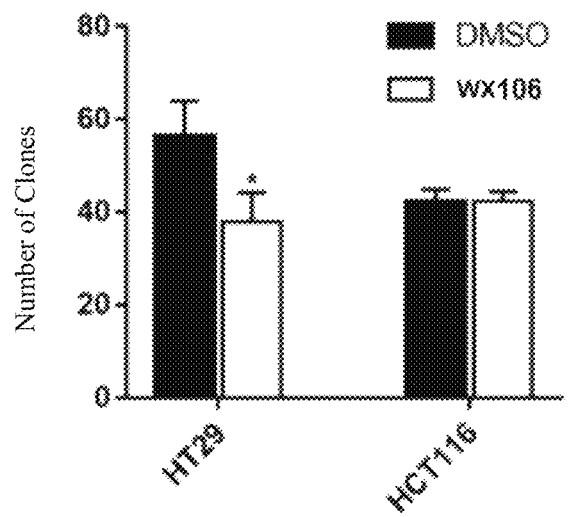
Figure 3:
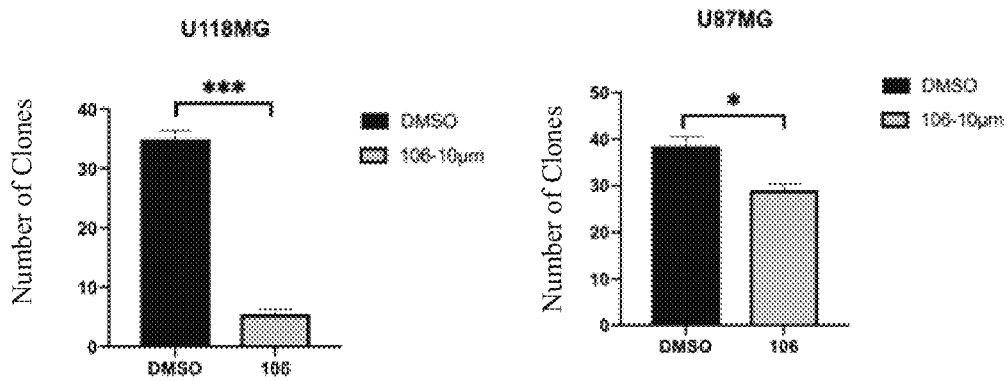
Figure 4:
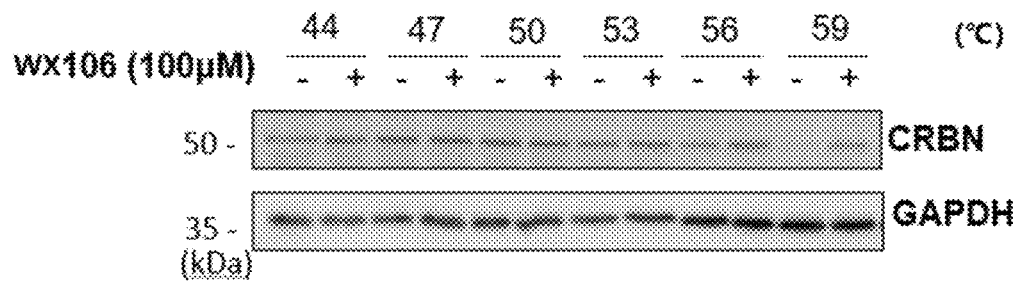
Figure 5:
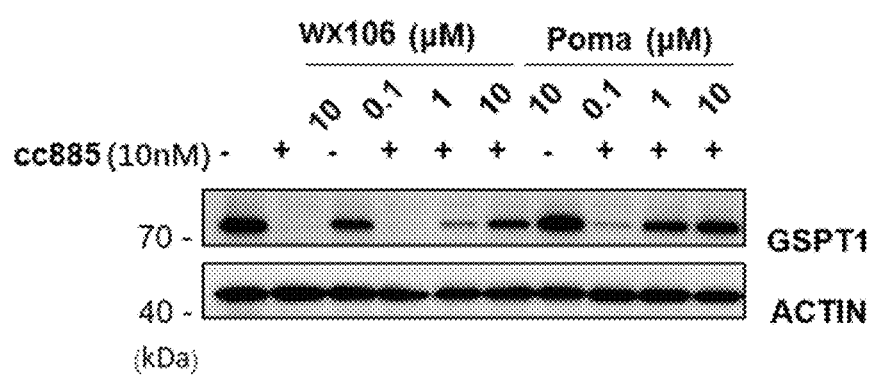
Figure 6:
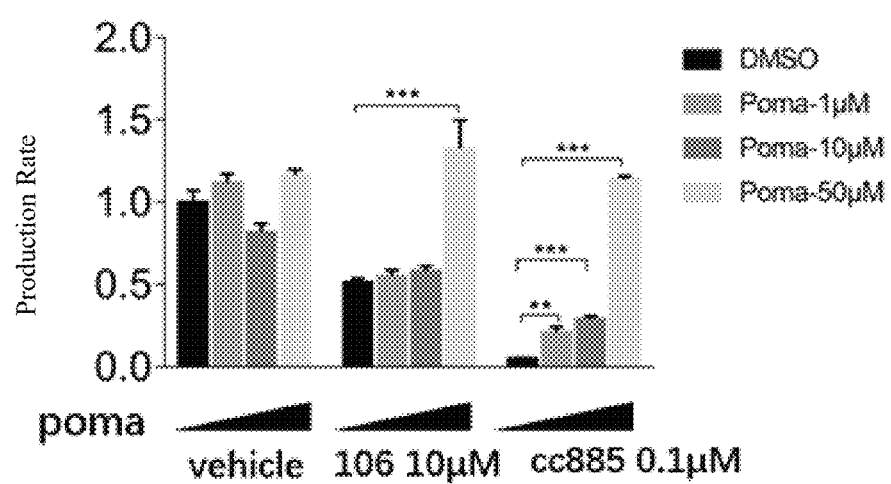
Figure 7:
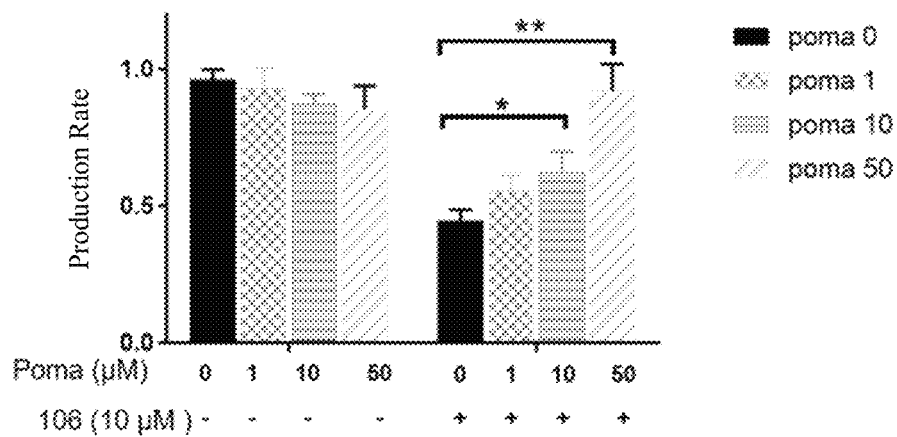
Figure 8:
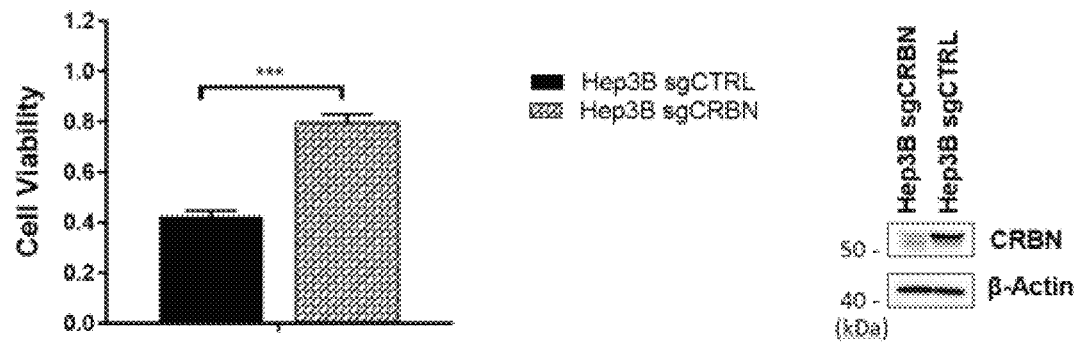
Figure 9:
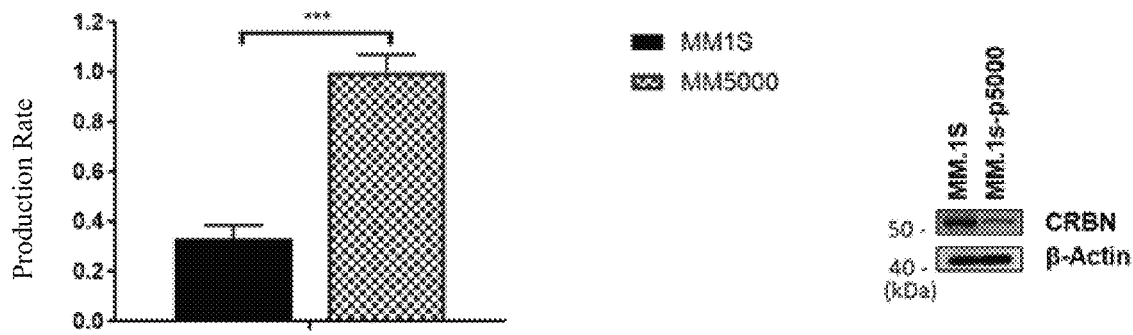
Figure 10:
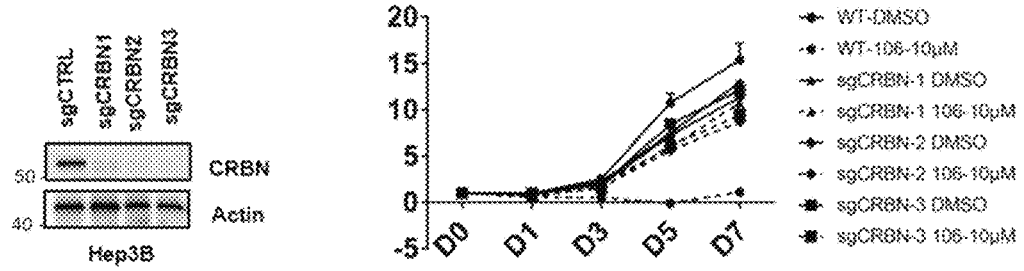
Figure 11:
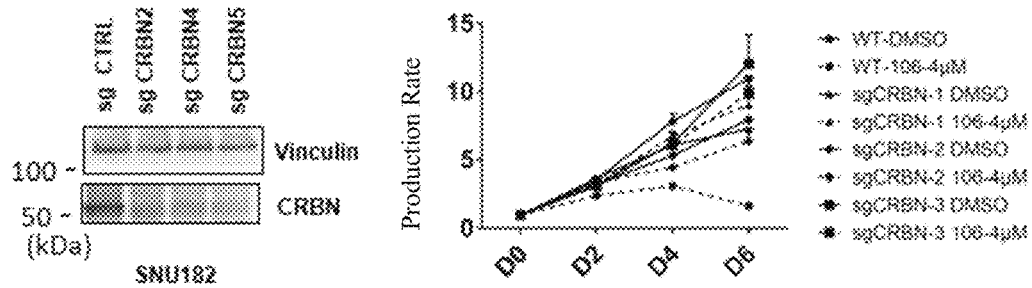
Figure 12:
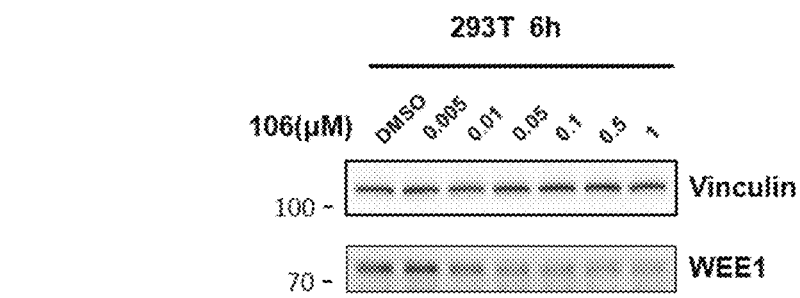
Figure 13:
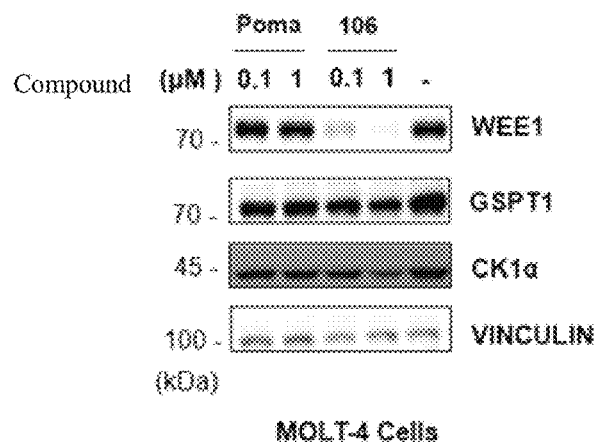
Figure 14:
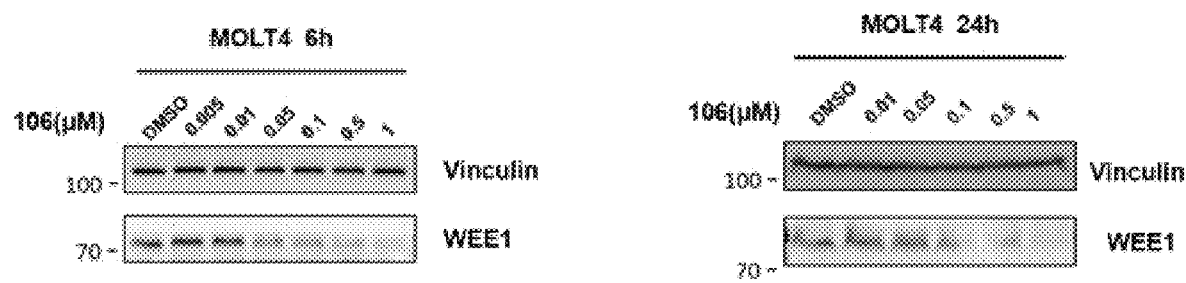
Figure 15:
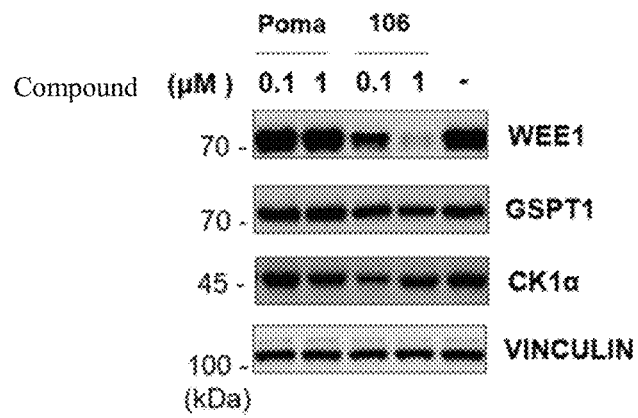
Figure 16:
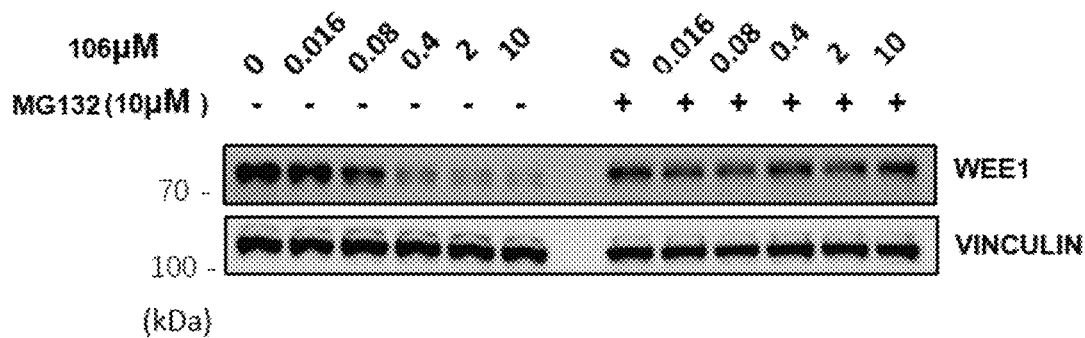
Figure 17:
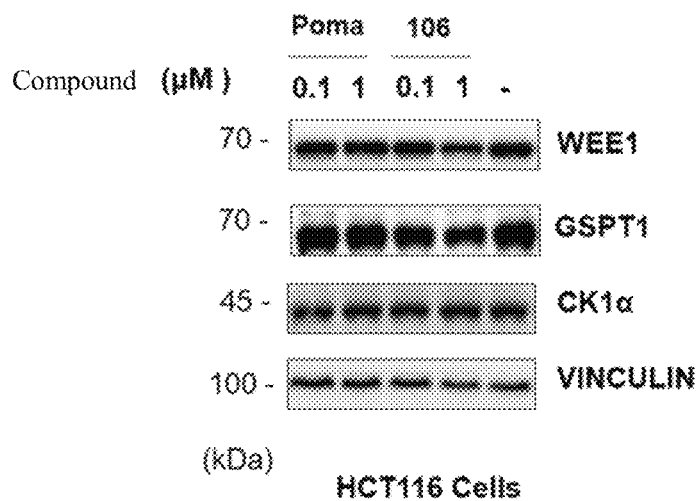
Figure 18:
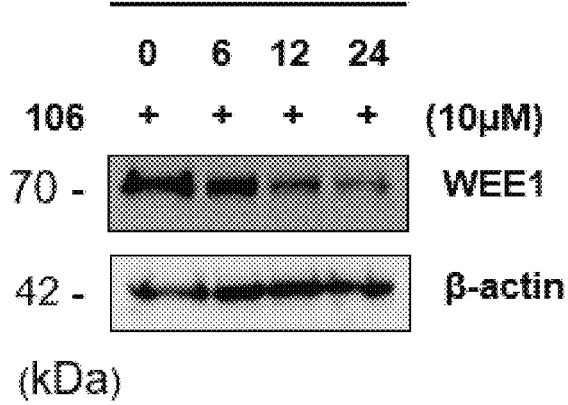
Figure 19:
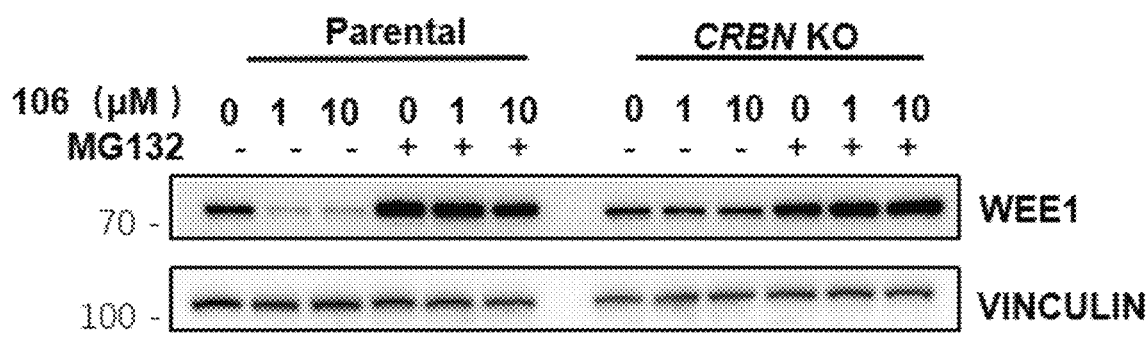
Figure 20:
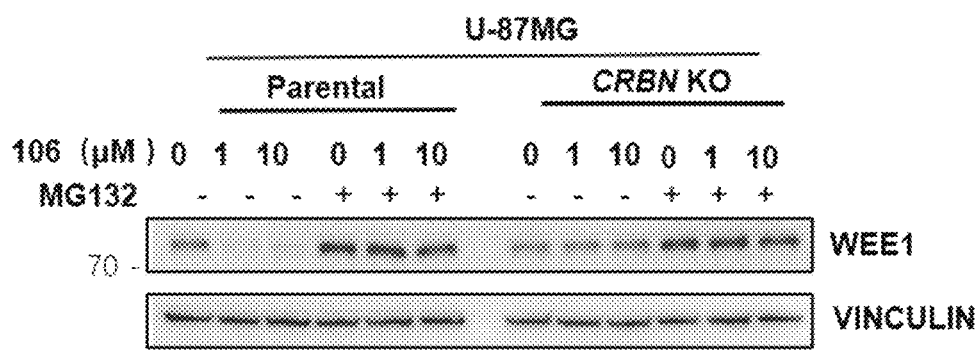
Figure 21:
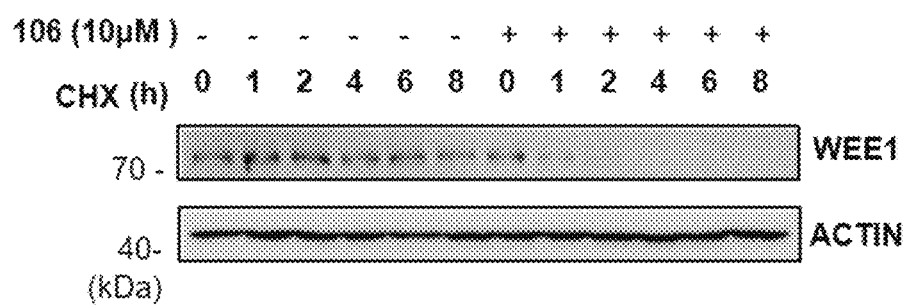
Figure 22:
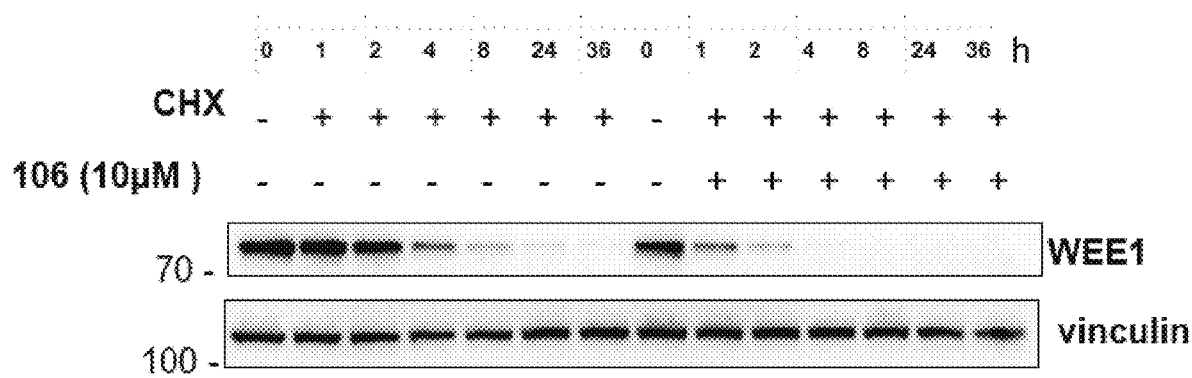
Figure 23:
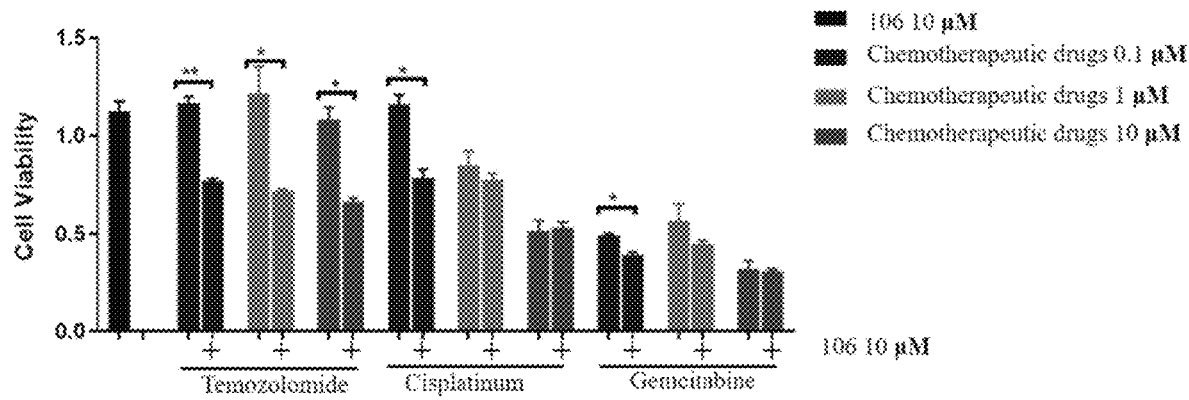
Figure 24:
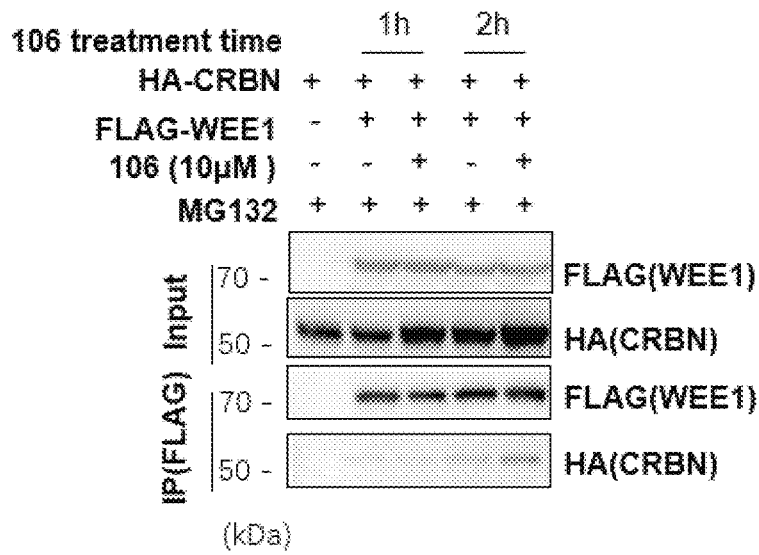
Figure 25:
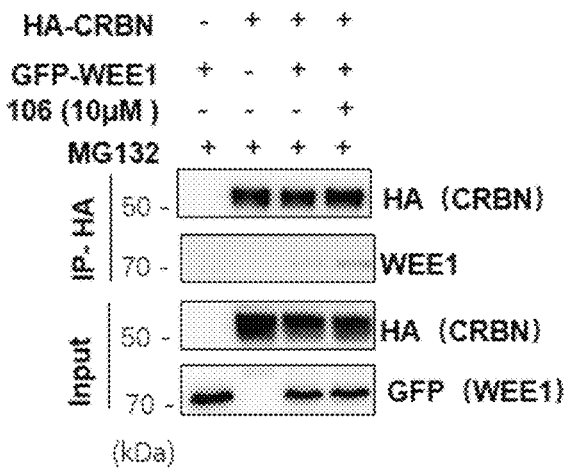
Figure 26:
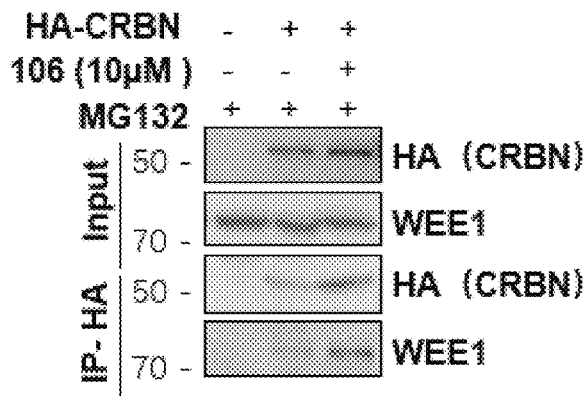
Figure 27:
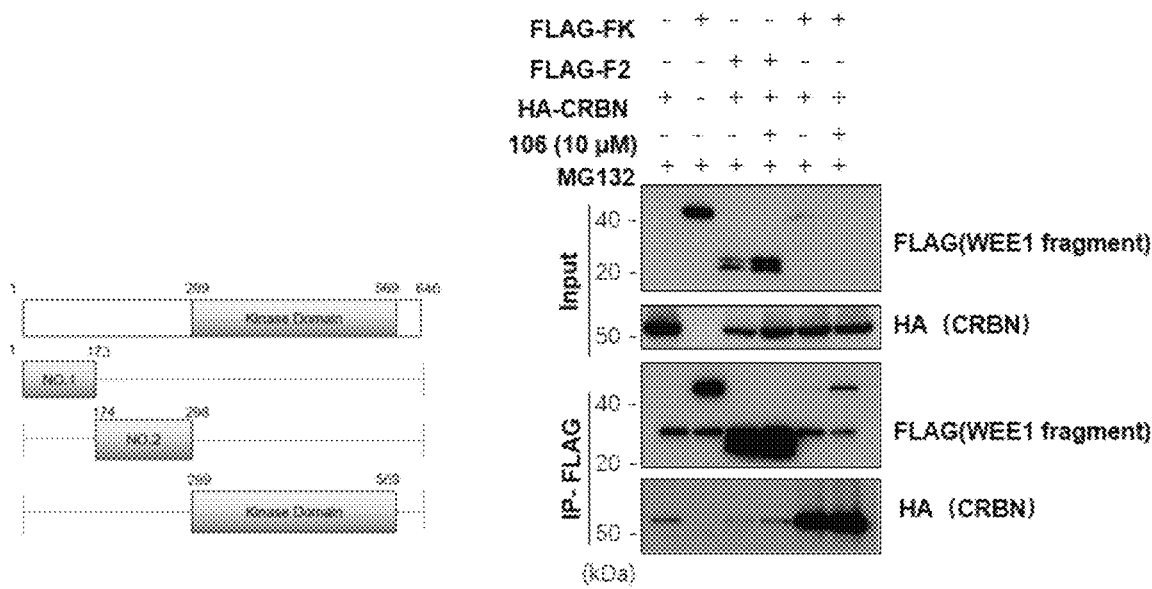
Figure 28:
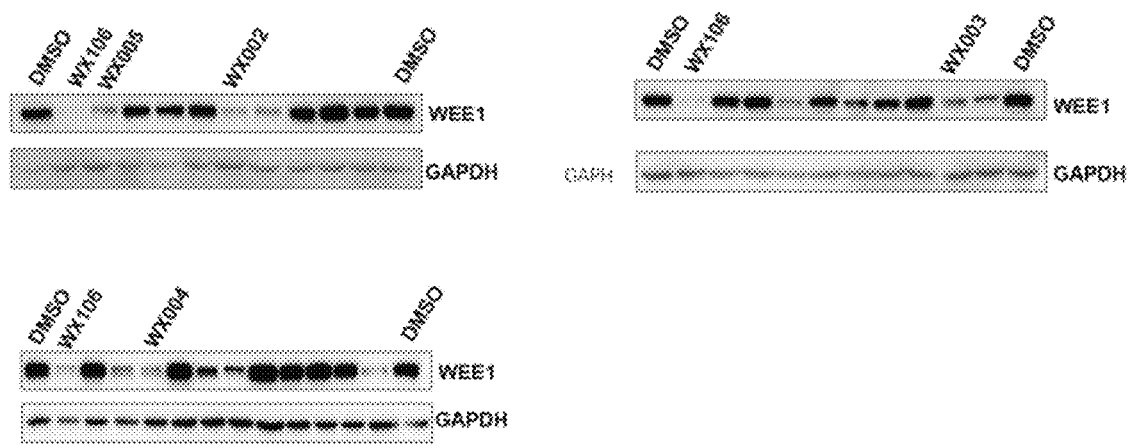
Figure 29:
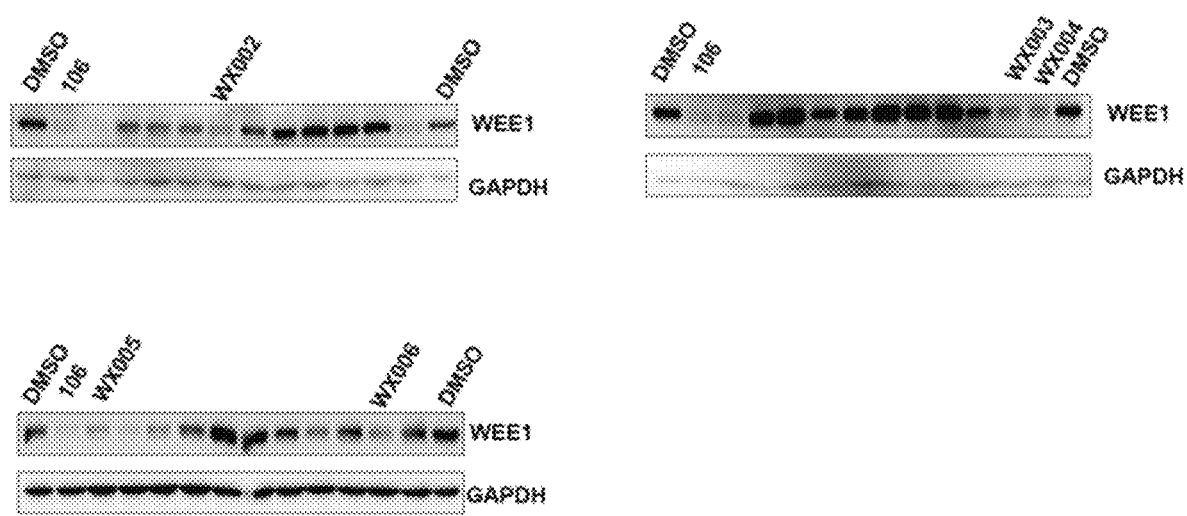

FIG. 1: inhibition rates of WX106 on the growth of different tumor cells;
FIG. 2: effect of WX106 on the clonogenicity of colorectal cancer cell lines;
FIG. 3: effect of WX106 on the clonogenicity of brain cancer cell lines;
FIG. 4: thermal displacement test results;
FIG. 5: experiment on competitive binding of WX106 and CC885 to CRBN;
FIG. 6: experiment on competitive binding of WX106 and Poma to CRBN in SNU182;
FIG. 7: experiment on competitive binding of WX106 and Poma to CRBN in Hep3B cells;
FIG. 8: experiment on CRBN-dependent inhibition of Hep3B cell proliferation by WX106;
FIG. 9: experiment on CRBN-dependent inhibition of MM.1S cell proliferation by WX106;
FIG. 10: experiment on CRBN-dependent inhibition of Hep3B cell proliferation by WX106;
FIG. 11: experiment on CRBN-dependent inhibition of SNU182 cell proliferation by WX106;
FIG. 12: experiment on promotion of Wee1 protein degradation in 293T cells by WX106;
FIG. 13: experiment on promotion of Wee1 protein degradation in MOLT-4 cells by WX106;
FIG. 14: experiment on promotion of Wee1 protein degradation in MOLT-4 cells by WX106;
FIG. 15: experiment on promotion of Wee1 protein degradation in U87-MG cells by WX106;
FIG. 16: experiment on promotion of Wee1 protein degradation in U87-MG cells by WX106;
FIG. 17: experiment on promotion of Wee1 protein degradation in HCT116 cells by WX106;
FIG. 18: experiment on promotion of Wee1 protein degradation in LN-229 cells by WX106;
FIG. 19: experiment on promotion of CRBN-dependent ubiquitin-mediated degradation of Wee1 protein in 293T cells by WX106;
FIG. 20: experiment on promotion of CRBN-dependent ubiquitin-mediated degradation of Wee1 protein in U87-MG cells by WX106;
FIG. 21: effects of WX106 on Wee1 protein stability in U87-MG cells;
FIG. 22: effects of WX106 on Wee1 protein stability in 293T cells;
FIG. 23: experiment on synergistic effects of WX106 and DNA damaging agents;
FIG. 24: experiment 1 on enhancement of the formation of Wee1-CRBN complex by WX106;
FIG. 25: experiment 2 on enhancement of the formation of Wee1-CRBN complex by WX106;
FIG. 26: experiment 3 on enhancement of the formation of Wee1-CRBN complex by WX106;
FIG. 27: binding of the kinase domain of Wee1 to CRBN;
FIG. 28: effects of Wee1 degradation by different compounds in MOLT-4 cells;
FIG. 29: effects of Wee1 degradation by different compounds in U87-MG cells.

SPECIFIC EMBODIMENTS

The present disclosure is described in detail below by way of examples. However, this is by no means disadvantageously limiting the scope of the present disclosure. The compound of the present disclosure may be prepared by a variety of synthetic methods well known to those skilled in the art, including the following enumerative embodiment, the embodiment formed by the following enumerative embodiment in combination with other chemical synthesis methods and the equivalent replacement well known to those skilled in the art. The preferred embodiment includes, but is not limited to the embodiment of the present disclosure. It will be apparent to those skilled in the art that various changes and modifications may be made to the specific embodiments of the present disclosure without departing from the spirit and scope of the present disclosure.

Embodiment 1: WX106

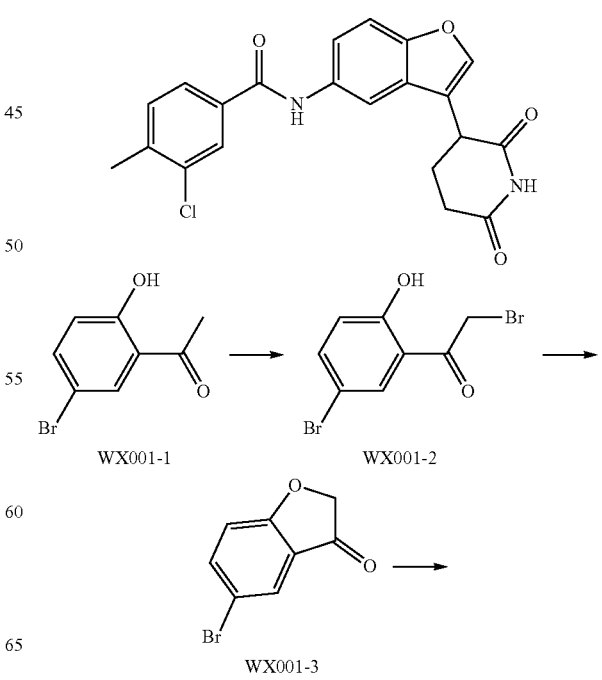

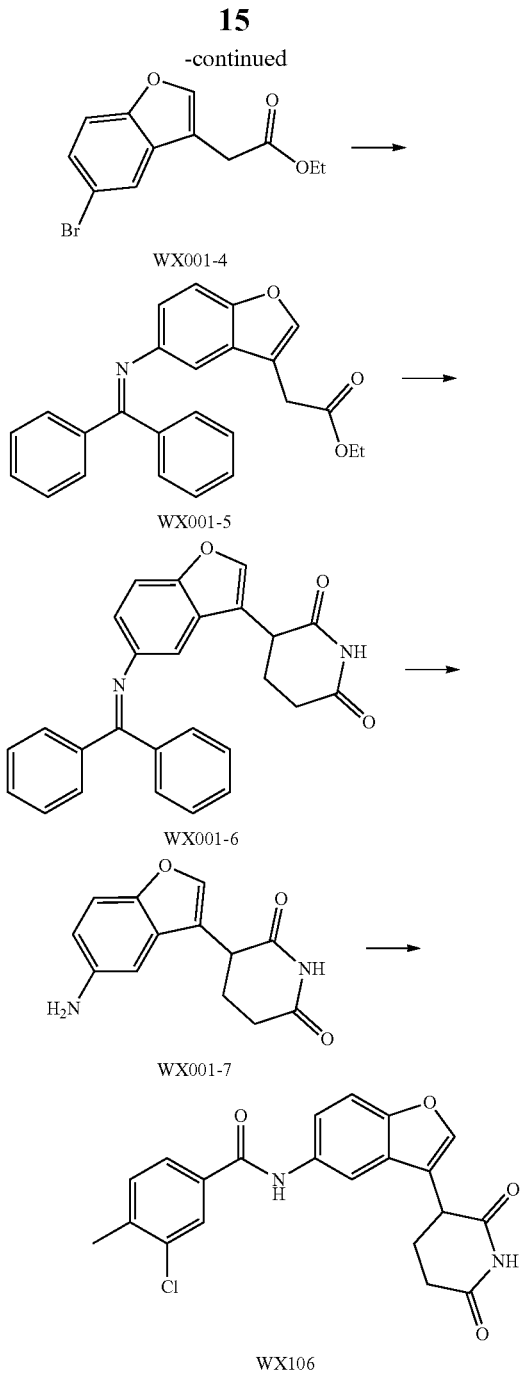

Step 1: Synthesis of Intermediate WX001-2

WX001-1 (100.00 g, 465.02 mmol) was dissolved in a mixed solution of chloroform (500 mL) and ethyl acetate (500 mL) at room temperature under nitrogen protection, and copper bromide (207.73 g, 930.04 mmol) was added thereafter; the reaction mixture was then heated to 100° C. and allowed to react with stirring at 100° C. for 14 hours. After the reaction was completed, the reaction solution was cooled to room temperature and filtered, and the filtrate was concentrated under reduced pressure to remove the solvent. Water (200 mL) was added to the residue, followed by dichloromethane (200 mL×3) for extraction. The organic phases were combined, washed with saturated brine (300 mL×2), dried over anhydrous sodium sulfate, and filtered. The intermediate WX001-2 obtained was dissolved in dichloromethane (465.02 mmol, 600 mL) and used directly in the next reaction.

Step 2: Synthesis of Intermediate WX001-3 Triethylamine (47.06 g, 465.02 mmol, 64.73 mL) was added to a solution of the intermediate WX001-2 in dichloromethane (465.02 mmol, 600 mL) at 0° C. under nitrogen protection, the reaction mixture was warmed to room temperature and allowed to react with stirring at room temperature for 0.5 hours. After the reaction was completed, water (300 mL) was added to the reaction solution, followed by dichloromethane (200 mL×3) for extraction. The organic phases were combined, washed with saturated brine (400 mL×2), dried over anhydrous sodium sulfate, and filtered. The intermediate WX001-3 obtained was dissolved in dichloromethane (465.02 mmol, 1,200 mL) and used directly in the next reaction.

Step 3: Synthesis of Intermediate WX001-4

Toluene (2,000 mL) was added to a solution of the intermediate WX001-3 in dichloromethane (465.02 mmol, 1,200 mL) at room temperature under nitrogen protection, and ethyl (triphenylphosphoranylidene)acetate (194.40 g, 558.02 mmol) was added thereafter; the reaction mixture was then heated to 130° C. and allowed to react with stirring at 130° C. for 60 hours. After the reaction was completed, it was cooled to room temperature, and the solvent was removed under reduced pressure. The residue obtained was separated by column chromatography (eluent: petroleum ether/ethyl acetate=1/0-70/1, volume ratio) to obtain the intermediate WX001-4. $^1$H NMR (400 MHz, CDCl$_3$) δ: 7.71 (d, J=2.0 Hz, 1H), 7.64 (s, 1H), 7.40 (d, J=8.6 Hz, 1H), 7.35 (d, J=8.8 Hz, 1H), 4.21 (q, J=7.2 Hz, 2H), 3.66 (d, J=0.8 Hz, 2H), 1.29 (t, J=7.2 Hz, 3H).

Step 4: Synthesis of Intermediate WX001-5

The intermediate WX001-4 (10.00 g, 35.32 mmol) and benzophenone imine (7.04 g, 38.85 mmol, 6.52 mL) were added to dioxane (100 mL) at room temperature under nitrogen protection, and tris(dibenzylideneacetone)dipalladium (1.62 g, 1.77 mmol), 4,5-bis(diphenylphosphino)-9,9-dimethylxanthene (2.04 g, 3.53 mmol) and cesium carbonate (17.26 g, 52.98 mmol) were successively added thereafter; the reaction mixture was then heated to 80° C. and allowed to react with stirring at 80° C. for 3 hours. After the reaction was completed, the reaction mixture was cooled to room temperature and water (150 mL) was added, followed by ethyl acetate (100 mL×3) for extraction. The organic phases were combined, washed with saturated brine (100 mL×2), dried over anhydrous sodium sulfate and filtered, and the solvent was removed from the filtrate under reduced pressure; finally, the residue obtained was separated by column chromatography (eluent: petroleum ether/ethyl acetate=1/0-10/1, volume ratio) to obtain the intermediate WX001-5. MS-ESI m/z: 384.4 [M+H]$^+$. $^1$H NMR (400 MHz, CDCl$_3$) δ: 7.76 (d, J=6.8 Hz, 2H), 7.56 (s, 1H), 7.53-7.46 (m, 1H), 7.44-7.39 (m, 2H), 7.26-7.19 (m, 4H), 7.15-7.10 (m, 2H), 6.94 (d, J=2.0 Hz, 1H), 6.66 (dd, J=2.2, 8.6 Hz, 1H), 4.16 (q, J=7.2 Hz, 2H), 3.56 (s, 2H), 1.27 (t, J=7.2 Hz, 3H).

Step 5: Synthesis of Intermediate WX001-6

The intermediate WX001-5 (15.83 g, 19.03 mmol, purity: 46.10%) was added to N,N-dimethylformamide (100 mL) at 0° C. under nitrogen protection, and potassium tert-butoxide (2.14 g, 19.03 mmol) and acrylamide (1.35 g, 19.03 mmol) were successively added to the above reaction solution thereafter; and the reaction mixture was allowed to react with stirring at 0° C. under nitrogen protection for 1 hour. After the reaction was completed, water (50 mL) was added, followed by ethyl acetate (30 mL×3) for extraction. The organic phases were combined, washed with saturated brine (20 mL×2), dried over anhydrous sodium sulfate and filtered, and the solvent was removed from the filtrate under reduced pressure; finally, the residue obtained was separated by column chromatography (eluent: petroleum ether/ethyl acetate=10/1-1/2, volume ratio) to obtain the intermediate WX001-6. $^1$H NMR (400 MHz, DMSO_$d_6$) δ: 10.87 (s, 1H), 7.79 (s, 1H), 7.68 (d, J=6.8 Hz, 2H), 7.56-7.50 (m, 1H), 7.49-7.45 (m, 2H), 7.37-7.27 (m, 4H), 7.15 (dd, J=3.0, 6.6 Hz, 2H), 6.86 (d, J=2.0 Hz, 1H), 6.69 (dd, J=2.2, 8.6 Hz, 1H), 3.99 (dd, J=5.0, 11.8 Hz, 1H), 2.70-2.63 (m, 1H), 2.49-2.40 (m, 1H), 2.13-2.00 (m, 1H), 1.98-1.90 (m, 1H).

Step 6: Synthesis of Intermediate WX001-7

The intermediate WX001-6 (1.55 g, 2.71 mmol, purity: 71.39%) was added to hydrochloric acid/ethyl acetate (4 M, 29.62 mL) at room temperature under nitrogen protection, and the reaction mixture was allowed to react with stirring at room temperature for 12 hours. After the reaction was completed, the solvent was removed under reduced pressure, and the residue obtained was separated by column chromatography (eluent: petroleum ether/ethyl acetate=10/1-0/1, volume ratio) to obtain the intermediate WX001-7. MS-ESI m/z: 245.1 [M+H]$^+$. $^1$H NMR (400 MHz, DMSO_$d_6$) δ: 10.97 (s, 1H), 10.23 (br s, 2H), 8.04 (s, 1H), 7.71 (d, J=8.8 Hz, 1H), 7.56 (d, J=2.0 Hz, 1H), 7.33 (dd, J=2.0, 8.8 Hz, 1H), 4.19 (dd, J=4.6, 12.2 Hz, 1H), 2.87-2.75 (m, 1H), 2.68-2.57 (m, 1H), 2.39-2.23 (m, 1H), 2.22-2.08 (m, 1H).

Step 7: Synthesis of Compound WX106

The intermediate WX001-7 (1.88 g, 6.00 mmol, purity: 77.97%) and 3-chloro-4-methylbenzoic acid (1.02 g, 6.00 mmol) were dissolved in N,N-dimethylformamide (10 mL) at room temperature under nitrogen protection, and 2-(7-benzotriazole oxide)-N,N,N',N'-tetramethyluronium hexafluorophosphate (3.42 g, 9.00 mmol) and triethylamine (607.29 mg, 6.00 mmol, 835.34 µL) were added thereafter; and the reaction mixture was allowed to react with stirring at room temperature for 3 hours. After the reaction was completed, water (50 mL) was added, followed by ethyl acetate (30 mL×3) for extraction. The organic phases were combined, washed with saturated brine (30 mL×2), dried over anhydrous sodium sulfate and filtered, and the solvent was removed from the filtrate under reduced pressure; finally, the residue obtained was separated by column chromatography (eluent: petroleum ether/ethyl acetate=10/1-1/2, volume ratio), followed by preparative HPLC (mobile phase: acetonitrile/water; acidic system: 0.05% HCl) to obtain the target compound WX106. MS-ESI m/z: 397.1 [M+H]$^+$, 399.0 [M+2+H]$^+$. $^1$H NMR (400 MHz, DMSO_$d_6$) δ: 10.96 (s, 1H), 10.33 (s, 1H), 8.05 (d, J=1.2 Hz, 1H), 8.00 (d, J=2.0 Hz, 1H), 7.92 (s, 1H), 7.87 (dd, J=1.6, 8.0 Hz, 1H), 7.67 (dd, J=2.0, 8.8 Hz, 1H), 7.57 (d, J=8.8 Hz, 1H), 7.52 (d, J=8.0 Hz, 1H), 4.14 (dd, J=4.8, 12.0 Hz, 1H), 2.85-2.75 (m, 1H), 2.68-2.57 (m, 1H), 2.42 (s, 3H), 2.36-2.25 (m, 1H), 2.19-2.10 (m, 1H).

Embodiment 2: WX002

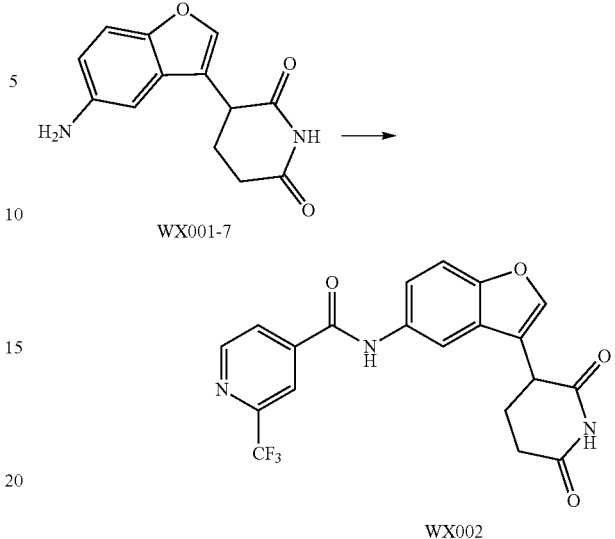

Intermediate WX001-7 (150.00 mg, 614.14 µmol) and 2-(trifluoromethyl)isonicotinic acid (117.37 mg, 614.14 µmol) were dissolved in N,N-dimethylformamide (3 mL) at room temperature under nitrogen protection, and O-(7-azabenzotriazol-1-yl)-N,N,N,N-tetramethyluronium hexafluorophosphate (350.27 mg, 921.21 µmol) and triethylamine (186.43 mg, 1.84 mmol, 256.44 µL) were added thereafter; and the reaction mixture was then left to react with stirring at room temperature for 15 hours. After the reaction was completed, water (30 mL) was added, followed by ethyl acetate (30 mL×3) for extraction. The organic phases were combined, washed with saturated brine (40 mL×2), dried over anhydrous sodium sulfate and filtered, and the solvent was removed from the filtrate under reduced pressure. The residue obtained was separated by preparative HPLC (mobile phase: acetonitrile/water; acidic system: 0.05% HCl) to obtain the target compound WX002. MS-ESI m/z: 418.0 [M+H]$^+$. $^1$H NMR (400 MHz, DMSO_$d_6$) δ: 10.94 (s, 1H), 10.75 (s, 1H), 9.00 (d, J=5.2 Hz, 1H), 8.39 (s, 1H), 8.22 (d, J=4.8 Hz, 1H), 7.99 (d, J=1.6 Hz, 1H), 7.94 (s, 1H), 7.67 (dd, J=1.8, 9.0 Hz, 1H), 7.61 (d, J=8.8 Hz, 1H), 4.15 (dd, J=4.8, 12.0 Hz, 1H), 2.82-2.74 (m, 1H), 2.69-2.61 (m, 1H), 2.35-2.28 (m, 1H), 2.20-2.11 (m, 1H).

Embodiment 3: WX003

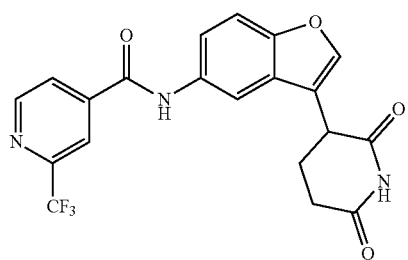

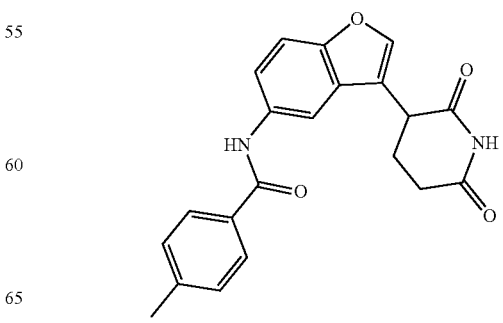

-continued

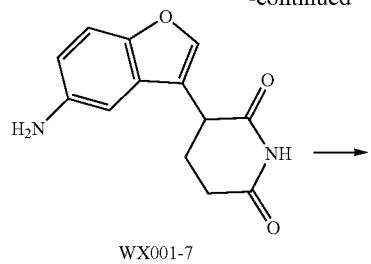

WX001-7

-continued

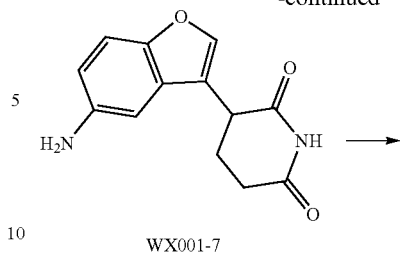

WX001-7

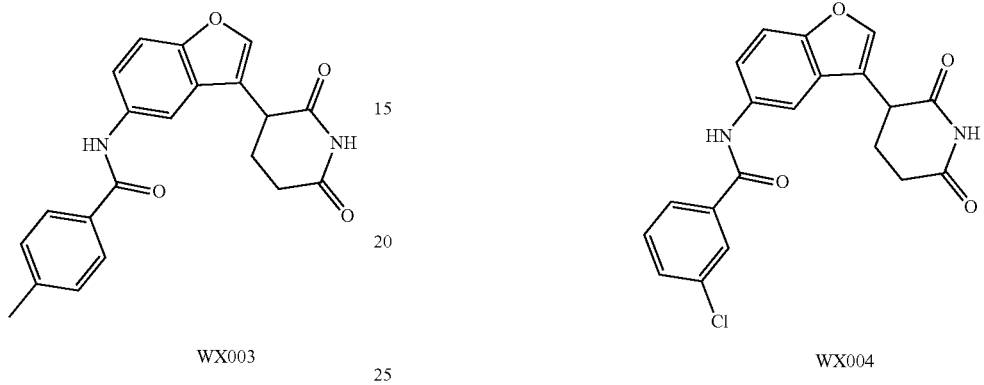

WX003

WX004

Intermediate WX001-7 (0.15 g, 534.37 μmol, hydrochloride) and p-toluic acid (87.30 mg, 641.24 μmol) were added to N,N-dimethylformamide (10 mL) at room temperature under nitrogen protection, and O-(7-azabenzotriazol-1-yl)-N,N,N,N-tetramethyluronium hexafluorophosphate (304.77 mg, 801.55 μmol) and triethylamine (162.22 mg, 1.60 mmol, 223.13 μL) were added thereafter; and the reaction mixture was allowed to react with stirring at room temperature for 12 hours. After the reaction was completed, water (50 mL) was added to dilute the reaction mixture and ethyl acetate (30 mL×3) was added for extraction thereafter. The organic phases were combined, washed with saturated brine (50 mL×2), dried over anhydrous sodium sulfate and filtered, and the solvent was removed from the filtrate under reduced pressure. The residue obtained was separated by preparative HPLC (mobile phase: acetonitrile/water; acidic system: 0.05% HCl) to obtain the target compound WX003. MS-ESI m/z: 363.2 [M+H]$^+$. $^1$H NMR (400 MHz, DMSO_d$_6$) δ: 10.96 (s, 1H), 10.21 (s, 1H), 8.02 (d, J=2.0H, 1H), 7.91 (s, 2H), 7.89 (s, 1H), 7.66 (dd, J=2.0, 8.8 Hz, 1H), 7.56 (d, J=8.8 Hz, 1H), 7.34 (d, J=8.0 Hz, 2H), 4.14 (dd, J=4.8, 12.0 Hz, 1H), 2.86-2.74 (m, 1H), 2.70-2.55 (m, 1H), 2.40 (s, 3H), 2.35-2.24 (m, 1H), 2.20-2.10 (m, 1H).

Embodiment 4: WX004

Intermediate WX001-7 (0.15 g, 534.37 μmol, hydrochloride) and 3-chlorobenzoic acid (100.40 mg, 641.24 μmol) were added to N,N-dimethylformamide (10 mL) at room temperature under nitrogen protection, and O-(7-azabenzotriazol-1-yl)-N,N,N,N-tetramethyluronium hexafluorophosphate (304.77 mg, 801.55 μmol) and triethylamine (162.22 mg, 1.60 mmol, 223.13 μL) were added thereafter; and the reaction mixture was allowed to react with stirring at room temperature for 2 hours. After the reaction was completed, water (50 mL) was added to dilute the reaction mixture and ethyl acetate (30 mL×3) was added for extraction thereafter. The organic phases were combined, washed with saturated brine (50 mL×2), dried over anhydrous sodium sulfate and filtered, and the solvent was removed from the filtrate under reduced pressure. The residue obtained was separated by preparative HPLC (mobile phase: acetonitrile/water; acidic system: 0.05% HCl) to obtain the target compound WX004. MS-ESI m/z: 383.1 [M+H]$^+$. $^1$H NMR (400 MHz, DMSO_d$_6$) δ: 10.96 (s, 1H), 10.41 (s, 1H), 8.04 (t, J=1.6H, 1H), 8.00 (d, J=1.6 Hz, 1H), 7.94 (d, J=7.6 Hz, 1H), 7.93 (s, 1H), 7.73-7.63 (m, 2H), 7.61-7.54 (m, 2H), 4.15 (dd, J=5.0, 12.2 Hz, 1H), 2.88-2.74 (m, 1H), 2.69-2.55 (m, 1H), 2.37-2.26 (m, 1H), 2.20-2.10 (m, 1H).

Embodiment 5: WX005

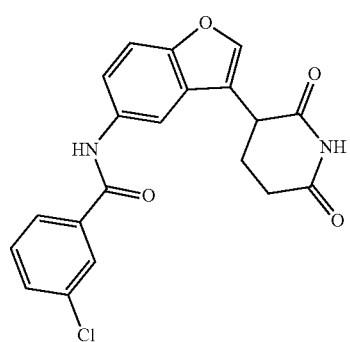

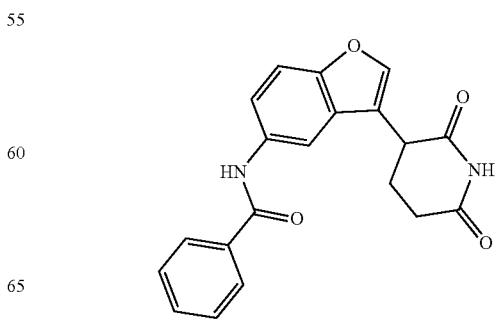

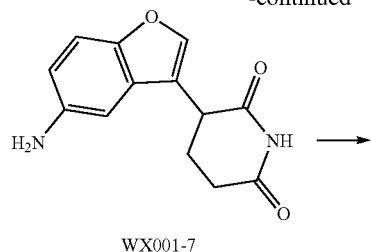

WX001-7

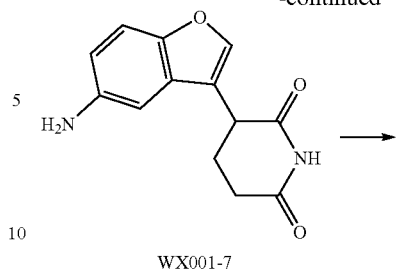

WX001-7

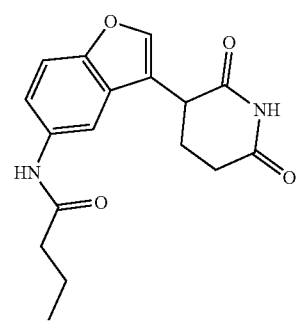

WX005

Intermediate WX001-7 (0.15 g, 534.37 μmol, hydrochloride) and benzoic acid (78.31 mg, 641.24 μmol) were added to N,N-dimethylformamide (10 mL) at room temperature under nitrogen protection, and O-(7-azabenzotriazol-1-yl)-N,N,N,N-tetramethyluronium hexafluorophosphate (304.77 mg, 801.55 μmol) and triethylamine (162.22 mg, 1.60 mmol, 223.13 μL) were added thereafter; and the reaction mixture was allowed to react with stirring at room temperature for 2 hours. After the reaction was completed, water (50 mL) was added to dilute the reaction mixture and ethyl acetate (30 mL×3) was added for extraction thereafter. The organic phases were combined, washed with saturated brine (50 mL×2), dried over anhydrous sodium sulfate and filtered, and the solvent was removed from the filtrate under reduced pressure. The residue obtained was separated by preparative HPLC (mobile phase: acetonitrile/water; acidic system: 0.05% HCl) to obtain the target compound WX005. MS-ESI m/z: 349.1 [M+H]$^+$. $^1$H NMR (400 MHz, DMSO_d$_6$) δ: 10.96 (s, 1H), 10.31 (s, 1H), 8.03 (d, J=2.0 Hz, 1H), 7.98 (dd, J=1.6, 6.8 Hz, 2H), 7.92 (s, 1H), 7.67 (dd, J=2.0, 8.8 Hz, 1H), 7.63-7.49 (m, 4H), 4.15 (dd, J=4.8, 12.0 Hz, 1H), 2.88-2.74 (m, 1H), 2.71-2.56 (m, 1H), 2.37-2.26 (m, 1H), 2.20-2.10 (m, 1H).

Embodiment 6: WX006

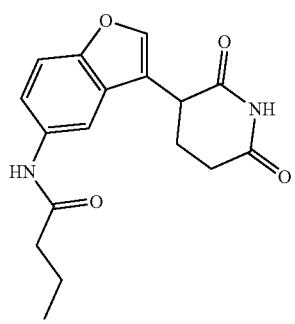

Intermediate WX001-7 (0.100 g, 402.96 μmol, purity: 98.42%) and butyric acid (35.50 mg, 402.96 μmol) were added to N,N-dimethylformamide (5 mL) at room temperature under nitrogen protection, and O-(7-azabenzotriazol-1-yl)-N,N,N,N-tetramethyluronium hexafluorophosphate (229.82 mg, 604.43 μmol) and triethylamine (122.33 mg, 1.21 mmol, 168.26 μL) were added thereafter; and the reaction mixture was allowed to react with stirring at room temperature for 3 hours. After the reaction was completed, water (20 mL) was added to dilute the reaction mixture and ethyl acetate (15 mL×3) was added for extraction thereafter. The organic phases were combined, washed with saturated brine (15 mL×2), dried over anhydrous sodium sulfate and filtered, and the solvent was removed from the filtrate under reduced pressure. The residue obtained was separated by preparative HPLC (mobile phase: acetonitrile/water; acidic system: 0.05% HCl) to obtain the target compound WX006. MS-ESI m/z: 315.2 [M+H]$^+$. $^1$H NMR (400 MHz, DMSO_d$_6$) δ: 10.95 (s, 1H), 9.91 (s, 1H), 7.88 (s, 1H), 7.87 (d, J=1.6 Hz, 1H), 7.49 (d, J=8.8 Hz, 1H), 7.45 (dd, J=1.8, 8.6 Hz, 1H), 4.11 (dd, J=4.8, 12.0 Hz, 1H), 2.87-2.74 (m, 1H), 2.70-2.55 (m, 1H), 2.28 (t, J=7.2 Hz, 2H), 2.26-2.21 (m, 1H), 2.17-2.09 (m, 1H), 1.68-1.55 (m, 2H), 0.92 (t, J=7.4 Hz, 3H).

Embodiment 7: WX007

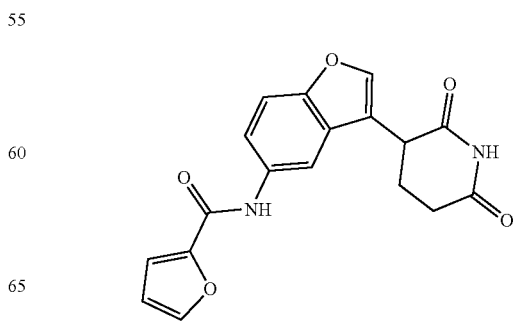

23
-continued

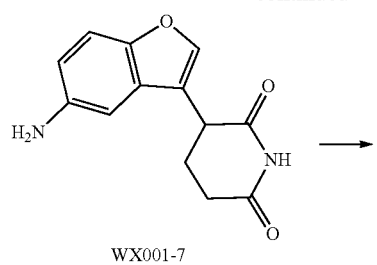
WX001-7

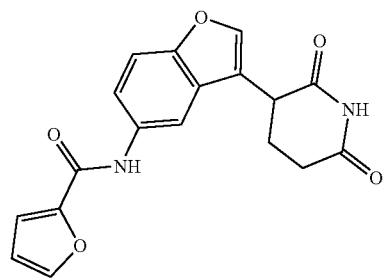
WX007

Intermediate WX001-7 (0.150 g, 614.14 µmol) and furan-2-carboxylic acid (137.67 mg, 1.23 mmol) were dissolved in N,N-dimethylformamide (6 mL) at room temperature under nitrogen protection, and O-(7-azabenzotriazol-1-yl)-N,N,N,N-tetramethyluronium hexafluorophosphate (350.27 mg, 921.20 µmol) and triethylamine (186.43 mg, 1.84 mmol, 256.44 µL) were successively added thereafter; and the reaction mixture was allowed to react with stirring at room temperature for 12 hours. After the reaction was completed, water (50 mL) was added to dilute the reaction mixture and ethyl acetate (30 mL×3) was added for extraction thereafter. The organic phases were combined, washed with saturated brine (30 mL×2), dried over anhydrous sodium sulfate and filtered, and the solvent was removed from the filtrate under reduced pressure; finally, the residue obtained was separated by preparative HPLC (mobile phase: acetonitrile/water; acidic system: 0.05% HCl) to obtain the target compound WX007. MS-ESI m/z: 339.0 [M+H]$^+$. $^1$H NMR (400 MHz, DMSO_d$_6$) δ: 10.94 (s, 1H), 10.22 (s, 1H), 7.97-7.92 (m, 2H), 7.90 (s, 1H), 7.66 (dd, J=2.2, 9.0 Hz, 1H), 7.55 (d, J=8.8 Hz, 1H), 7.32 (d, J=3.2 Hz, 1H), 6.70 (dd, J=2.0, 3.2 Hz, 1H), 4.13 (dd, J=5.0, 12.2 Hz, 1H), 2.85-2.74 (m, 1H), 2.70-2.57 (m, 1H), 2.36-2.24 (m, 1H), 2.19-2.10 (m, 1H).

Embodiment 8: WX008

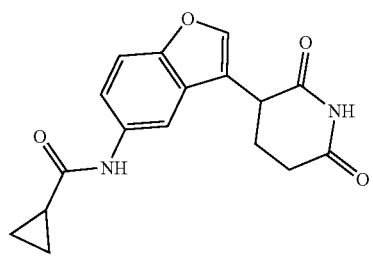

24
-continued

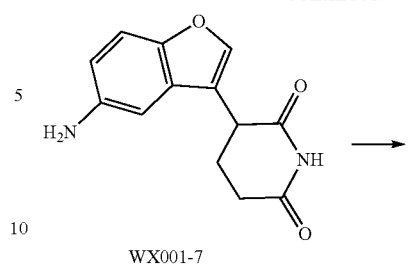
WX001-7

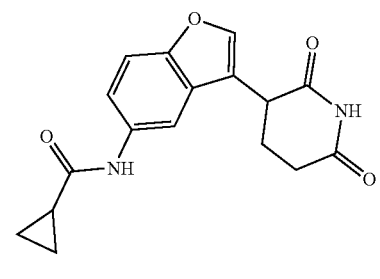
WX008

Intermediate WX001-7 (0.150 g, 614.14 µmol) and cyclopropanecarboxylic acid (63.44 mg, 736.96 µmol) were dissolved in N,N-dimethylformamide (10 mL) at room temperature under nitrogen protection, and O-(7-azabenzotriazol-1-yl)-N,N,N,N-tetramethyluronium hexafluorophosphate (350.27 mg, 921.20 µmol) and triethylamine (186.43 mg, 1.84 mmol, 256.44 µL) were successively added thereafter; and the reaction mixture was allowed to react with stirring at room temperature for 12 hours. After the reaction was completed, water (50 mL) was added to dilute the reaction mixture and ethyl acetate (40 mL×3) was added for extraction thereafter. The organic phases were combined, washed with saturated brine (30 mL×2), dried over anhydrous sodium sulfate and filtered, and the solvent was removed from the filtrate under reduced pressure; finally, the residue obtained was separated by preparative HPLC (mobile phase: acetonitrile/water; acidic system: 0.05% HCl) to obtain the target compound WX008. MS-ESI m/z: 313.0 [M+H]$^+$. $^1$H NMR (400 MHz, DMSO_d$_6$) δ: 10.93 (s, 1H), 10.23 (s, 1H), 7.88 (s, 1H), 7.87 (s, 1H), 7.53-7.47 (m, 1H), 7.46-7.41 (m, 1H), 4.10 (dd, J=4.8, 12.0 Hz, 1H), 2.78-2.73 (m, 1H), 2.61 (s, 1H), 2.27-2.17 (m, 1H), 2.16-2.13 (m, 1H), 1.78-1.78 (m, 1H), 0.80-077 (m, 4H).

Embodiment 9: WX009

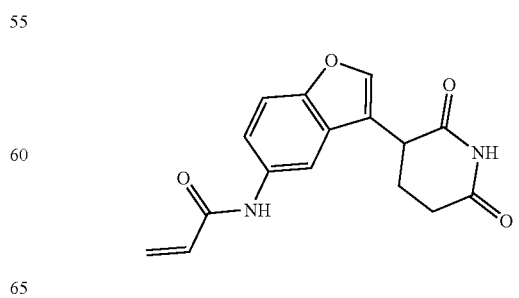

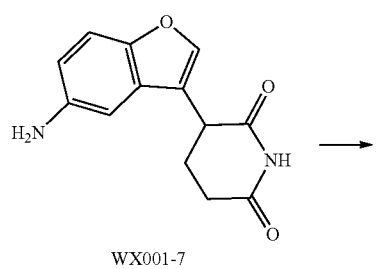

WX001-7

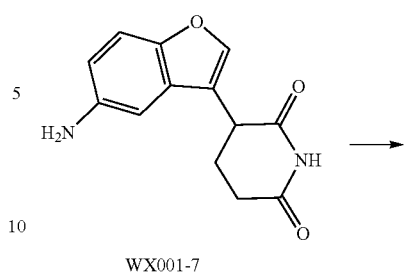

WX001-7

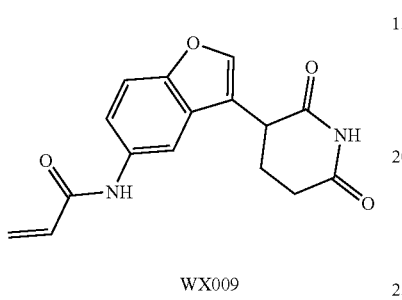

WX009

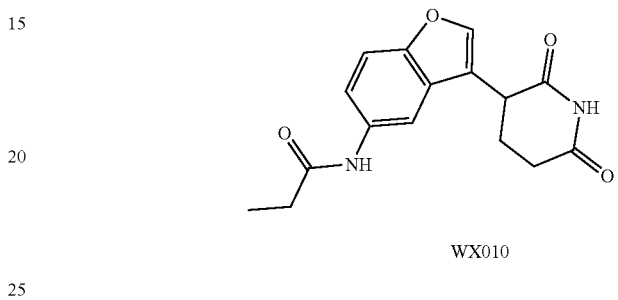

WX010

Intermediate WX001-7 (152.00 mg, 541.49 μmol, hydrochloride) and acrylic acid (39.02 mg, 541.49 μmol, 37.16 μL) were dissolved in N,N-dimethylformamide (5 mL) at room temperature under nitrogen protection, and O-(7-azabenzotriazol-1-yl)-N,N,N,N-tetramethyluronium hexafluorophosphate (308.84 mg, 812.24 μmol) and triethylamine (164.38 mg, 1.62 mmol, 226.11 μL) were successively added thereafter; and the reaction mixture was allowed to react with stirring at room temperature for 15 hours. After the reaction was completed, water (30 mL) was added, followed by ethyl acetate (30 mL×3) for extraction. The organic phases were combined, washed with saturated brine (40 mL×2), dried over anhydrous sodium sulfate and filtered, and the solvent was removed from the filtrate under reduced pressure; finally, the residue obtained was separated by preparative HPLC (mobile phase: acetonitrile/water; acidic system: 0.05% HCl) to obtain the target compound WX009. MS-ESI m/z: 299.0 [M+H]$^+$. $^1$H NMR (400 MHz, DMSO_d$_6$) δ: 10.95 (s, 1H), 10.20 (s, 1H), 7.94 (s, 1H), 7.90 (s, 1H), 7.53 (br s, 2H), 6.44 (dd, J=10.2, 17.0 Hz, 1H), 6.25 (dd, J=2.0, 17.2 Hz, 1H), 5.74 (dd, J=2.0, 10.0 Hz, 1H), 4.12 (dd, J=5.2, 12.0 Hz, 1H), 2.83-2.74 (m, 1H), 2.65-2.55 (m, 1H), 2.29-2.20 (m, 1H), 2.17-2.07 (m, 1H).

Embodiment 10: WX010

Intermediate WX001-7 (0.150 g, 614.14 μmol) and propionic acid (45.49 mg, 614.14 μmol, 45.82 μL) were dissolved in N,N-dimethylformamide (3 mL) at room temperature under nitrogen protection, and O-(7-azabenzotriazol-1-yl)-N,N,N,N-tetramethyluronium hexafluorophosphate (350.27 mg, 921.21 μmol) and triethylamine (186.43 mg, 1.84 mmol, 256.44 μL) were successively added thereafter; and the reaction mixture was allowed to react with stirring at room temperature for 15 hours. After the reaction was completed, water (30 mL) was added to dilute the reaction mixture and ethyl acetate (30 mL×3) was added for extraction thereafter. The organic phases were combined, washed with saturated brine (40 mL×2), dried over anhydrous sodium sulfate and filtered, and the solvent was removed from the filtrate under reduced pressure; finally, the residue obtained was separated by preparative HPLC (mobile phase: acetonitrile/water; acidic system: 0.05% HCl) to obtain the target compound WX010. MS-ESI m/z: 301.0 [M+H]$^+$. $^1$H NMR (400 MHz, DMSO_d$_6$) δ: 10.92 (s, 1H), 9.88 (s, 1H), 7.88-7.84 (m, 2H), 7.51-7.40 (m, 2H), 4.10 (dd, J=4.8, 12.0 Hz, 1H), 2.83-2.72 (m, 1H), 2.63-2.55 (m, 1H), 2.31 (q, J=7.5 Hz, 2H), 2.28-2.19 (m, 1H), 2.16-2.08 (m, 1H), 1.09 (t, J=7.6 Hz, 3H).

Embodiment 11: WX011

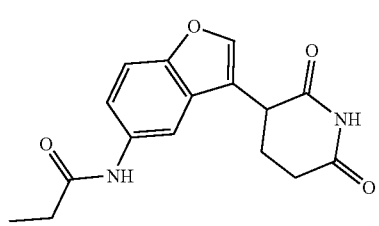

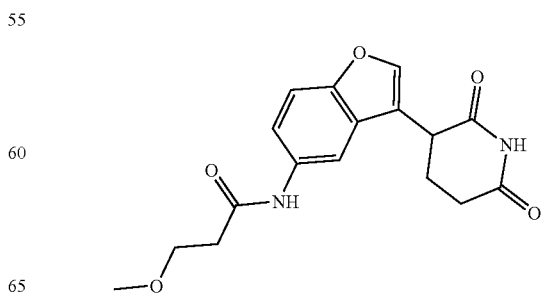

27
-continued

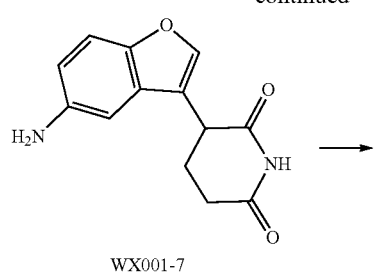

WX001-7

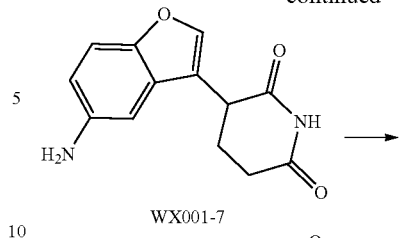

WX011

Intermediate WX001-7 (0.100 g, 402.96 μmol) and 3-methoxypropionic acid (41.95 mg, 402.96 μmol, 37.79 μL) were dissolved in N,N-dimethylformamide (5 mL) at room temperature under nitrogen protection, and O-(7-azabenzotriazol-1-yl)-N,N,N,N-tetramethyluronium hexafluorophosphate (229.82 mg, 604.43 μmol) and triethylamine (122.33 mg, 1.21 mmol, 168.26 μL) were successively added thereafter; and the reaction mixture was allowed to react with stirring at room temperature for 3 hours. After the reaction was completed, water (20 mL) was added to dilute the reaction mixture and ethyl acetate (10 mL×3) was added for extraction thereafter. The organic phases were combined, washed with saturated brine (10 mL×2), dried over anhydrous sodium sulfate and filtered, and the solvent was removed from the filtrate under reduced pressure. The residue obtained was separated by preparative HPLC (mobile phase: acetonitrile/water; acidic system: 0.05% HCl) to obtain the target compound WX011. MS-ESI m/z: 331.2 [M+H]$^+$. $^1$H NMR (400 MHz, DMSO_d$_6$) δ: 10.91 (s, 1H), 9.98 (s, 1H), 7.89-7.87 (m, 2H), 7.50 (d, J=8.8 Hz, 1H), 7.44 (dd, J=2.0, 8.8 Hz, 1H), 4.11 (dd, J=5.0, 12.2 Hz, 1H), 3.62 (t, J=6.2 Hz, 2H), 3.24 (s, 3H), 2.84-2.73 (m, 1H), 2.69-2.58 (m, 1H), 2.54 (q, J=6.2 Hz, 2H), 2.35-2.20 (m, 1H), 2.15-2.09 (m, 1H).

Embodiment 12: WX012

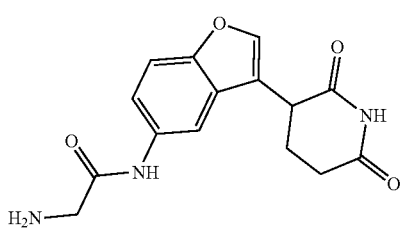

28
-continued

WX001-7

WX012-1

WX012

Step 1: Synthesis of Intermediate WX012-1

Intermediate WX001-7 (202 mg, 719.61 μmol, hydrochloride) and N-(tert-butoxycarbonyl)glycine (126.06 mg, 719.61 μmol) were dissolved in N,N-dimethylformamide (10 mL) at room temperature under nitrogen protection, and O-(7-azabenzotriazol-1-yl)-N,N,N,N-tetramethyluronium hexafluorophosphate (410.43 mg, 1.08 mol) and triethylamine (218.45 mg, 2.16 mmol, 300.49 μL) were successively added thereafter; and the reaction mixture was allowed to react with stirring at room temperature for 14 hours. After the reaction was completed, water (50 mL) was added to dilute the reaction solution and ethyl acetate (50 mL×3) was added for extraction thereafter. The organic phases were combined, washed with saturated brine (100 mL×2), dried over anhydrous sodium sulfate and filtered, and the solvent was removed from the filtrate under reduced pressure; finally, the residue obtained was subjected to plate separation (eluent: petroleum ether/ethyl acetate=1/2, volume ratio) to obtain the intermediate WX012-1. MS-ESI m/z: 423.9 [M+Na]$^+$. $^1$H NMR (400 MHz, DMSO_d$_6$) δ: 10.92 (s, 1H), 9.94 (s, 1H), 7.98-7.81 (m, 2H), 7.51 (d, J=8.8 Hz, 1H), 7.47-7.41 (m, 1H), 7.02 (t, J=5.8 Hz, 1H), 4.11 (dd, J=5.0, 11.8 Hz, 1H), 3.72 (d, J=6.4 Hz, 2H), 2.83-2.74 (m, 1H), 2.62-2.56 (m, 1H), 2.34-2.21 (m, 1H), 2.16-2.10 (m, 1H), 1.39 (s, 9H).

Step 2: Synthesis of Compound WX012

Intermediate WX012-1 (256 mg, 637.75 μmol) was added to hydrochloric acid/ethyl acetate (4 M, 20 mL) at room temperature under nitrogen protection, and the reaction mixture was allowed to react with stirring at room temperature for 2 hours. After the reaction was completed, the reaction solution was concentrated under reduced pressure to remove the solvent, methanol (5 mL) was added to the residue obtained, and the mixture was stirred at room temperature for 0.5 hour. The reaction solution was filtered and the filter cake was washed with methanol (2 mL); finally, the filter cake was collected and concentrated under reduced pressure to obtain the target compound WX012. MS-ESI m/z: 302.1 [M+H]$^+$. $^1$H NMR (400 MHz, DMSO_$d_6$) δ: 10.94 (s, 1H), 10.64 (br s, 1H), 8.03 (br s, 2H), 7.92 (s, 1H), 7.86 (br s, 1H), 7.59-7.54 (m, 1H), 7.51-7.43 (m, 1H), 4.13 (dd, J=4.2, 11.8 Hz, 1H), 3.75 (s, 2H), 2.84-2.73 (m, 1H), 2.68-2.56 (m, 1H), 2.34-2.19 (m, 1H), 2.18-2.08 (m, 1H).

Embodiment 13: WX013

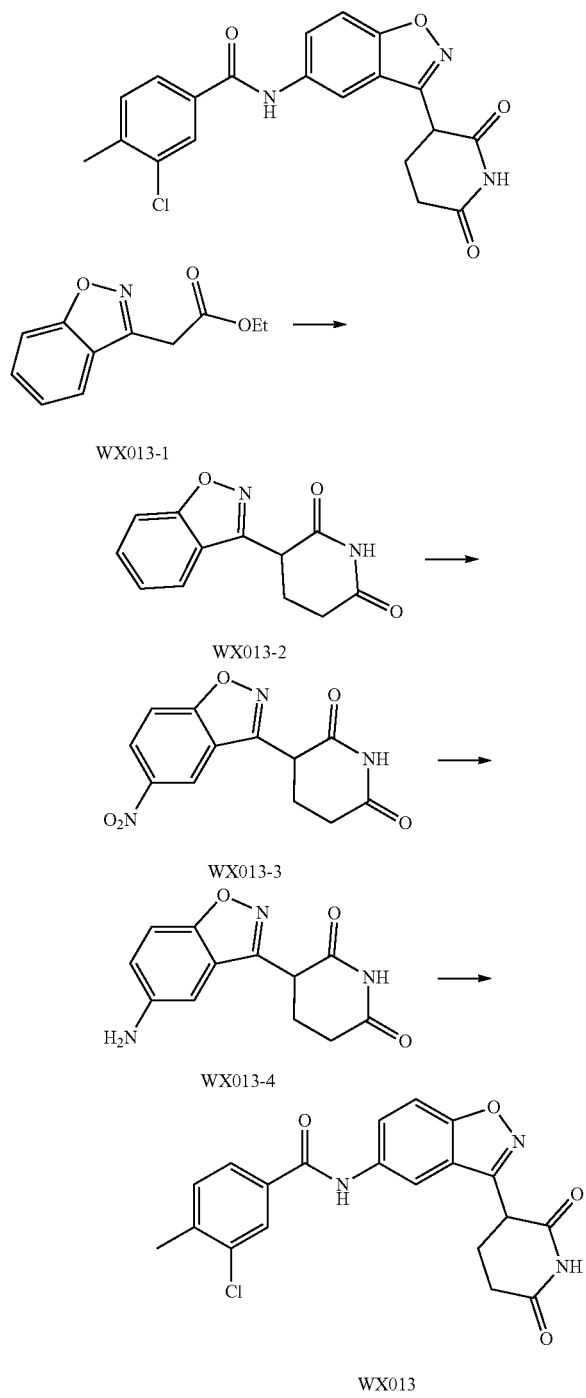

Step 1: Synthesis of Intermediate WX013-2

Intermediate WX013-1 (5 g, 24.37 mmol) and acrylamide (1.73 g, 24.37 mmol) were dissolved in tetrahydrofuran (150 mL) at room temperature, and a solution of potassium tert-butoxide in tetrahydrofuran (1 M, 24.37 mL) was slowly added dropwise thereafter; and the reaction mixture was allowed to react with stirring at room temperature for 12 hours. After the reaction was completed, ice water (200 mL) was added, followed by 2-methyltetrahydrofuran (150 mL×3) for extraction. The organic phases were combined, washed with saturated brine (150 mL×3), dried over anhydrous sodium sulfate, filtered, and concentrated under reduced pressure to remove the solvent. The residue was separated by column chromatography (neutral alumina: 200-300 mesh, eluent: petroleum ether/ethyl acetate=1/0-0/1, volume ratio) to obtain the intermediate WX013-2. $^1$H NMR (400 MHz, DMSO_$d_6$) δ: 11.12 (s, 1H), 7.87 (d, J=8.0 Hz, 1H), 7.77 (d, J=8.4 Hz, 1H), 7.70-7.63 (m, 1H), 7.40 (t, J=7.2 Hz, 1H), 4.62 (dd, J=5.2, 11.6 Hz, 1H), 2.85-2.74 (m, 1H), 2.65-2.52 (m, 2H), 2.24-2.18 (m, 1H).

Step 2: Synthesis of Intermediate WX013-3

Intermediate WX013-2 (1 g, 4.34 mmol) was dissolved in concentrated sulfuric acid (5 mL, purity: 98%) at room temperature under nitrogen protection, cooled to 0° C., and potassium nitrate (447.93 mg, 4.43 mmol) was added thereafter; and the reaction mixture was allowed to react with stirring at 0° C. for 1 hour. After the reaction was completed, ice water (100 mL) was added, followed by 2-methyltetrahydrofuran (60 mL×3) for extraction. The organic phases were combined, washed with water (80 mL×3), washed with saturated brine (80 mL×3), dried over anhydrous sodium sulfate, filtered, and concentrated under reduced pressure to remove the solvent, so as to obtain the intermediate WX013-3, which was directly used in the next-step reaction.

Step 3: Synthesis of Intermediate WX013-4

The above intermediate WX013-3 (0.7 g, 2.54 mmol) was dissolved in ethanol (14 mL) at room temperature under nitrogen protection, stannous chloride dihydrate (4.02 g, 17.80 mmol) was added, and the reaction mixture was then heated to 50° C. and allowed to react with stirring at 50° C. for 12 hours. After the reaction was completed, the reaction solution was cooled to room temperature, concentrated under reduced pressure to remove the solvent, and diluted with water (100 mL); finally, saturated aqueous sodium bicarbonate solution was added for pH adjustment to 7 and 2-methyltetrahydrofuran (150 mL×3) was added for extraction. The organic phases were combined, dried over anhydrous sodium sulfate, filtered, and concentrated under reduced pressure to remove the solvent; finally, the residue obtained was separated by preparative HPLC (mobile phase: acetonitrile/water; acidic system: 0.05% HCl) to obtain the hydrochloride salt of intermediate WX013-4.

Step 4: Synthesis of Compound WX013

3-chloro-4-methylbenzoic acid (54.50 mg, 319.49 μmol) was dissolved in N,N-dimethylformamide (3 mL) at room temperature under nitrogen protection, and O-(7-azabenzotriazol-1-yl)-N,N,N,N-tetramethyluronium hexafluorophosphate (182.22 mg, 479.24 μmol) and triethylamine (96.99 mg, 958.48 μmol, 133.41 μL) were successively added thereafter; the reaction mixture was allowed to react with stirring at room temperature for 0.5 hours, the hydrochloride salt of intermediate WX013-4 (0.09 g, 319.49 μmol) was added, and the reaction mixture was then allowed to react with stirring at room temperature for 12 hours. After the reaction was completed, the reaction solution was directly concentrated under reduced pressure to remove the solvent, and the residue obtained was separated by preparative HPLC (mobile phase: acetonitrile/water; acidic system: 0.05% HCl) to obtain the target compound WX013. MS-ESI m/z: 398.0 [M+H]$^+$. $^1$H NMR (400 MHz, MeOD) δ: 8.22 (d, J=2.0 Hz, 1H), 7.99 (d, J=2.0 Hz, 1H), 7.84 (dd, J=2.0, 9.2 Hz, 1H), 7.81 (dd, J=1.8, 7.8 Hz, 1H), 7.65 (d, J=8.8 Hz, 1H), 7.46 (d, J=8.0 Hz, 1H), 4.53 (dd, J=5.0, 11.0 Hz, 1H), 2.86-2.80 (m, 2H), 2.65-2.53 (m, 1H), 2.46 (s, 3H), 2.41-2.35 (m, 1H).

Experimental Example 1: Cell Experiment

Different cells were seeded in 96-well plates (the density of adherent cells was 1,000/well and the density of suspension cells was 10,000/well), 10 μM of WX106 was added for 72 hours of action, and CCK-8 reagent (Meilun Biotechnology, MA0218-L) was added for 2 hours of reaction thereafter; and the plate was then read with a microplate reader (SpectraMax i3) and the inhibition rate was calculated. Inhibition rate=[(Ac−As)/(Ac−Ab)]×100% (where As represents the absorbance of experimental wells, Ac represents the absorbance of control wells, and Ab represents the absorbance of blank wells).

Eighteen tumor cell lines were treated with 10 μM of WX106 for 72 hours, and the rate of inhibition of cell growth by WX106 was calculated. The experimental results are shown in FIG. 1.

Conclusion: WX106 has greater than 50% growth inhibitory effect on hematological tumor cells and some liver cancer cells.

Experimental Example 2: Clone Formation Experiment

The effect of the compound on the monoclone-formation capacity of cells was examined. Cells were seeded in 6-well plates at low density (about 500 cells per well), 10 μM of WX106 was added for treatment, crystal violet staining (Beyotime Biotechnology, C0121) was performed when the cells grew into clones visible to the naked eye, and the number of clones was counted. All treatments were performed in at least three replicates. The experimental results are shown in FIGS. 2 and 3.

Conclusion: 10 μM of WX106 inhibits clone formation in some colorectal cancer cells and brain tumor cell lines.

Experimental Example 3: Thermal Displacement Experiment

The experiment utilizes the principle that the binding of small molecular compounds to proteins can improve the thermal stability of proteins. 3×10$^7$ cells were collected and washed twice with phosphate buffered saline (PBS). 100× protease inhibitor cocktail (APEXBIO, K1007) was added to pre-cooled PBS to suspend the cells, and 500 μL of cell suspension was aliquoted into each 1.5 EP tube. The EP tube was placed in liquid nitrogen for quick freezing for 5 min and then transferred to a 26° C. water bath quickly; thereafter, the EP tube was transferred to a 4° C. environment when the liquid is half thawed, until it is completely thawed. This freeze-thaw procedure was performed thrice to allow complete protein precipitation from the cells. The frozen-thawed product was centrifuged at 4° C. for 20 min, the supernatant was aspirated and mixed, and then aliquoted into 1.5 mL EP tubes, and DMSO and WX106 were added respectively to adjust the concentration of WX106 in the solution to 100 μM. Incubation was performed with slow shaking at room temperature for 30 min to fully bind the drug to the protein. The solution was aliquoted into 200 μL PCR tubes, and the PCR temperatures were set (44, 47, 50, 53, 56, 59° C.) based on a duration of 3 min at each temperature. After the heat shock at all temperatures, the DMSO- and WX106-treated samples at each temperature were collected respectively, centrifuged at 4° C. for 20 min, and the concentration of BCA protein (Thermo) was quantified; at the same time, Western blot was performed to detect the changes of CRBN (Anti-CRBN antibody, Sigma Company, HPA045910) protein content. The changes in protein content are shown in FIG. 4. DMSO or WX106 (100 μM) was added to 293T cell lysates, respectively; thereafter, the cell lysates were incubated at room temperature for 30 minutes, and then subjected to heat shock at the specified temperature. Detection of changes in CRBN protein expression was performed. CRBN protein abundance was significantly increased at 56° C. and 59° C.

Conclusion: The binding of WX106 to CRBN results in CRBN stabilization.

Experimental Example 4: Protein Degradation Competition Experiment

Principle: It is known that the compound CC885 is capable of hijacking CRBN to promote the ubiquitin-mediated degradation of GSPT1 (abcam, Anti-eRF3/GSPT1 antibody (ab49878)). If a compound is capable of binding to CRBN and has no apparent pro-GSPT1 degradation itself, it will competitively inhibit the pro-GSPT1 degradation effect of CC885. MOLT-4 cells were co-treated with 0.1, 1 and 10 μM of WX106 and 10 nM of CC885 for 4 hours, and the protein level of GSPT1 was then detected by Western blot, with Poma (Pomalidomide, Selleck, S1567) acting as the positive control in the experiment. Cells were collected and denatured in protein loading buffer (50 mM Tris-HCL 2% SDS, 0.025% BPB, 1% β-mercaptoethanol, 10% glycerol) at 98° C. for 10 min. Proteins were separated by SDS-PAGE and transferred to a PVDF membrane (Millipore, IPVH00010), blocked with 5% skim milk (dissolved in TBST buffer), incubated with a primary antibody overnight at 4° C., and then incubated with a secondary antibody (Anti-rabbit IgG, HRP-linked Antibody, Cell Signaling, 7074S) at room temperature for 1 hour, and the bands on the membrane were detected by chemiluminescence (ECL chemiluminescence kit, Beyotime Biotechnology, P0018AM).

As shown in FIG. 5, CC885 and WX106 or Poma of different concentrations were added to MOLT-4 cells, and GSPT1 protein expression was detected by Western blot. With the increase of WX106 concentration, the degradation of GSPT1 induced by CC885 was reversed, and Poma, as a positive control, could inhibit the pro-degradation of GSPT1 by CC885.

Conclusion: WX106 binds to CRBN in a competitive manner.

Experimental Example 5: Cell Growth Competition Experiment

Principle: It is known that Poma is a compound that binds to CRBN, and Poma has no obvious inhibitory effect on adherent cells. If a compound depends on CRBN to inhibit cell growth, Poma's competitive binding to CRBN will definitely affect the cytotoxic effect of this compound. Cells were treated with 1, 10 and 50 μM of Poma and 10 μM of WX106 for 72 hours; cell viability was detected using the CCK-8 kit and cell survival rate was calculated [based on the formula], cell survival rate=[(As −Ab)/(Ac−Ab)]×100% (where As represents the absorbance of the experimental wells, Ac represents the absorbance of the control wells, and Ab represents the absorbance of the blank wells); finally, the effect of the competitive binding of Poma on the cytotoxicity of WX106 was calculated to determine whether the cytotoxicity of WX106 is dependent on CRBN. This step was applied to both SUN182 and Hep3B cells.

The cell growth competition experiment performed in SNU182 is shown in FIG. 6, and Poma is capable of competitively inhibiting the cytotoxicity caused by WX106. CC885 was the positive control in this experiment and is known to kill tumor cells in a CRBN-dependent manner.

FIG. 7 shows a competition experiment in Hep3B where Poma is capable of competitively inhibiting the cytotoxicity caused by WX106.

Conclusion: The cytotoxic effect of WX106 is dependent on CRBN.

Experimental Example 6: Comparison of the Sensitivity of Wild-Type Cells Versus CRBN-Deficient or Low-CRBN-Expression Cell Lines to WX106

The sgRNA sequence targeting CRBN was inserted into lenti Crispr V2 plasmid, the virus was co-packaged with the packaging vectors psPAX2 and pVSVG, and the cells were infected; screening was performed with puromycin (Invitrogen, A1113803) and the knockout of CRBN was identified by Western blot; finally, the cell growth was detected to calculate the survival rate. The sgRNA sequences are shown in the following table:

| Gene Name | Sequence |
| --- | --- |
| CRBN#1-oligo1 | 5'-CACCGGTCCTGCTGATCTCCTTCGC-3' |
| CRBN#1-oligo2 | 5'-AAACGCGAAGGAGATCAGCAGGACC-3' |
| CRBN#2-oligo1 | 5'-CACCGATAGTACCTAGGTGCTGATA-3' |
| CRBN#2-oligo2 | 5'-AAACTATCAGCACCTAGGTACTATC-3' |
| CRBN-oligo1 | 5'-CACCGCGCACCATACTGACTTCTTG-3' |
| CRBN#3-oligo2 | 5'-AAACCAAGAAGTCAGTATGGTGCGC-3' |

WX106 (10 µM) was added to wild-type Hep3B cells and Hep3B CRBN KO (knockout) hybrid clone cells, respectively, and cell proliferation was detected by CCK-8 after 72 h. The experimental results are shown in FIG. 8. The results showed that the sensitivity of Hep3B cells to WX106 was significantly reduced after CRBN knockout.

WX106 (10 µM) was added to MM.1S cells and MM.1S-p5000 (Poma-resistant low-CRBN-expression cell line) cells, respectively, and cell proliferation was detected by CCK-8 after 72 h. The experimental results are shown in FIG. 9. In the presence of low CRBN expression, cells were significantly less sensitive to WX106.

Stable CRBN knockout cell lines (pool) were established in Hep3B and SNU182 cells, respectively, and treated with WX106 (10 µM) or solvent; the growth of cells was detected at different time points and the growth curves were drawn. The experimental results are shown in FIG. 10 and FIG. 11. Cells with normal CRBN expression were very sensitive to WX106, while the growth rate of cells in low-CRBN-expression cell lines showed no significant difference compared with the solvent group, after WX106 was added to both.

Conclusion: Compound WX106 inhibits tumor cell growth in a CRBN-dependent manner.

Experimental Example 7: Label-Free Quantitative Mass Spectrometry for Proteomic Analysis There are three treatment methods for the selected MOLT-4 cells; one is to directly add DMSO as a control, the other is to add 10 µM WX106, and the third is to add 10 µM WX106 and 10 µM MG132 (proteasome inhibitor; APEXBIO, A2585 and MG132 are capable of blocking ubiquitin-mediated protein degradation). Two replicates were prepared for the 10 µM WX106 plus 10 µM MG132 group, and three replicates were prepared for the DMSO control group and 10 µM WX106 administration group, respectively. The drug treatment time for MOLT-4 was 6 hours. Mass spectrometry samples were prepared based on the basic steps of urea cleavage, reductive alkylation, desalting, and lyophilization. The prepared samples were subjected to two-hour gradient analysis on a Q Exactive HF mass spectrometer, followed by data analysis.

Table 1 shows the results of mass spectrometry. In the two cell lines, the Wee1 signal was observed in the solvent group, but not in the WX106 group. After adding WX106 and MG132 concurrently, the Wee1 signal was restored, suggesting that WX106 promoted the ubiquitin-mediated degradation of Wee1 protein.

TABLE 1

|  | DMSO | WX106 | WX106 + MG132 |
| --- | --- | --- | --- |
| MOLT-4(LFQ intensity) | 1640200 | 0 | 186700 |
|  | 2250200 | 0 | 2690600 |
|  | 2548500 | 0 | / |

Experimental Example 8: Detection of Protein Degradation by the Drug

Cells were seeded in 6-well plates at a density of about 70%, and the compound WX106 of different concentrations (concentrations shown in the accompanying drawings) were added for 6 hours of treatment, and then the whole-cell lysates were collected for target protein detection. The antibody used was: (Wee1 (D10D2) Rabbit mAb, Cell Signaling, 13084S). To investigate whether drug-induced protein degradation occurs via the ubiquitin pathway, MG132 was used to block ubiquitin-mediated protein degradation. This method was also applied to 293T, MOLT-4, U87-MG, HCT116, and LN-229.

FIG. 12 shows the changes in Wee1 protein abundance after 6 hours of treatment with different concentrations of WX106 in 293T cells. FIG. 13 and FIG. 14 show the effect of WX106 on Wee1 protein expression in MOLT-4 cells. According to FIG. 13, the effects of WX106 on the substrates GSPT1 and CK1a (Abcam, ab108296) of other glutarimide ring-structured compounds were also examined, and the results showed that WX106 had no significant pro-degradation effect on GSPT1 and CK1α. FIGS. 15 and 16 show that WX106 has a significant pro-degradation effect on Wee1 in U87-MG cells. FIG. 17 shows that WX106 has a weak pro-degradation effect on Wee1 in HCT116 cells. FIG. 18 shows the effect of WX106 treatment on Wee1 degradation in LN-229 cells at different times.

Conclusion: The above results show that WX106 promotes Wee1 protein degradation.

293T cells and 293T CRBN KO cells were treated with DMSO, 1 µM WX106, 10 µM WX106 alone or in combination with 10 µM MG132 for 16 h, the whole-cell lysates were collected, and Wee1 protein expression was detected using Western blot. The experimental results are shown in FIG. 19. It was observed that WX106 promoted Wee1 degradation in wild-type cells, while the level of Wee1 expression in CRBN-deficient cells showed no significant change, suggesting that the degradation of Wee1 by WX106 is CRBN-dependent. In wild-type cells, the pro-degradation effect of WX106 on Wee1 was absent when MG132 was added, suggesting that WX106 affects the ubiquitin-mediated degradation of Wee1. U87-MG cells and U87-MG CRBN KO cells were treated with 10 µM WX106 or WX106 plus 10 µM MG132 for 16 h, and the level of Wee1 protein expression was detected using Western blot. The experimental results are shown in FIG. 20, which are similar to the results shown in FIG. 19.

Conclusion: WX106 promotes ubiquitin-mediated degradation of Wee1 in a CRBN-dependent manner.

Experimental Example 9: Effect of the Drug on Protein Stability

Cells were seeded in 6-well plates at a density of about 70% and treated with 10 µM WX106 or solvent, and 100 µg/mL cycloheximide (CHX) (APEXBIO, A8244) was concurrently added to prevent protein biosynthesis. The samples were collected at different time intervals, and finally the effect of WX106 on Wee1 stability was examined FIG. 21 and FIG. 22 show the effect of WX106 on Wee1 stability in U87-MG and 293T cells, respectively. After treatment with WX106, the cells reached elimination half-life in about 2 hours, while Wee1 protein expression was significantly stable in the cell group treated with solvent.

Conclusion: WX106 affects the stability of Wee1 protein.

Experimental Example 10: Drug Synergism Experiment

U87-MG cells were treated with WX106 and DNA damaging agents, temozolomide, cisplatin, and gemcitabine for 72 hours, respectively, and the proliferation level of cells was detected by CCK-8. Among them, the WX106 concentration was 10 µM, and the DNA damaging agent concentrations were 0.1 µM, 1 µM and 10 µM, respectively. The experimental results are shown in FIG. 23.

Conclusion: Temozolomide combined with WX106 significantly inhibits the proliferation of U87-MG cells. Cisplatin and gemcitabine at low concentrations and in combination with WX106 also significantly inhibit the proliferation of U87-MG cells.

Experimental Example 11: Co-Immunoprecipitation

The plasmid was transfected into 293T cells. After 24 hours, the compound WX106 was added to treat the cells for a certain period of time. The cells were lysed with NETN lysis buffer (150 mM NaCl, 50 mM Tris-HCl of pH 8.0, 1% NP40), followed by incubation with agarose beads (EZview™ Red anti-HA affinity gel, Sigma, E6779; anti-FLAG® M2 affinity gel, Sigma, A2220) and lysis buffer for 2 hours. The beads were washed 4 times with lysis buffer, loading buffer (100 mM Tris-HCl, 4% SDS, 0.05% BPB, 2% β-mercaptoethanol, 20% glycerol) was added and detection was performed using Western blot.

According to FIG. 24, HA CRBN (CRBN was overexpressed in cells by transfection technology; HA is a polypeptide and CRBN fusion expression; CRBN refers to endogenous CRBN in cells) and FLAG Wee1 (Wee1 was overexpressed in cells by transfection technology; FLAG is a polypeptide and CRBN fusion expression; Wee1 refers to endogenous Wee1 in cells) were overexpressed in 293T cells [and left to stand] for 24 hours after transfection; thereafter, the cells were treated with 20 µM MG132 or 10 µM WX106 1 h and 2 h before they were harvested for Co-IP (co-immunoprecipitation) assay, respectively. The results showed that Wee1 interacted with CRBN, and the complex formed by Wee1 and CRBN was significantly increased when WX106 was added. According to FIG. 25, Co-IP experiments were performed with Wee1 with different tags, and the results were similar to FIG. 24. According to FIG. 26, overexpressed CRBN and endogenous Wee1 were used for co-immunoprecipitation. It was observed that CRBN interacted with Wee1, and the complex formed by Wee1 and CRBN was significantly increased when WX106 was added. According to FIG. 27, different Wee1 fragments were cloned separately and subjected to Co-IP with CRBN. The results showed that the kinase domain of Wee1 interacted with CRBN.

Conclusion: WX106 promotes the formation of Wee1-CRBN complex.

Experimental Example 12: Detection of Compounds that Degrade Wee1 Protein

MOLT-4 cells were treated with 10 µM of the test compound for 4 hours and U87-MG cells were treated with 1 µM of the test compound for 24 hours, respectively. With GAPDH (Santa Cruz, sc-32233) as the internal reference protein, the protein level of Wee1 (Cell Signaling, 13084S) was detected using Western blot. Cells were collected, lysed with protein loading buffer (1M Tris-HCl, 10% SDS, 0.025% BPB), and denatured at 98° C. for 10 min before Western blot analysis. The main steps include: 1) Electrophoresis: The protein was separated by SDS-PAGE electrophoresis. During the electrophoresis, the voltage was adjusted to 80 v for about 30 min, and then the voltage was adjusted to 120 v until the bromophenol blue ran out of the gel. 2) Transfer to a membrane: the gel was stuck to a methanol-activated PVDF membrane using the method of wet transfer, and after the top and bottom layers were wrapped with filter paper, the membrane was placed into the gel holder cassette and fixed to the transfer tank, and transfer was performed at a constant current of 250 mA for 90 min; 3) Blocking: the PVDF membrane with trace protein was placed into the antibody incubation box, 5% skim milk was added to completely cover the PVDF membrane, and incubation was performed for 1 hour on a shaker at room temperature; 4) Incubation of the primary antibody: the primary antibody was prepared with 5% BSA (1:1000) and incubated overnight on a shaker at 4° C.; 5) Incubation of the secondary antibody: the membrane was washed thrice with TBST, the secondary antibody (prepared with 5% skim milk) was added (according to the species source of the primary antibody, different secondary antibodies with a dilution range of 1:3000-1:10000 were used), and incubation was performed on a shaker at room temperature for one hour; 5) Exposure: the membrane was washed thrice with TBST and the bands on the membrane were detected by chemiluminescence.

Instruments, Experimental Materials and Buffer Formulations

Biorad PowerPac Basic Power Supply electrophoresis system

Biorad. Mini-PROTEAN® Tetra Cell vertical mini electrophoresis cell

BioRad Mini Trans-Blot Electrophoretic Transfer Cell

ChemiDoc Imaging System

Gel preparation kit: PAGE gel preparation kit (10%), EpiZyme, PG112

PVDF membrane: Millipore, IPVH00010

Skim milk powder: Sangon Biotech/BBI, A600669

BSA: Bovine Serum Albumin, ABCONE, A23088

Anti-rabbit secondary antibody: Anti-rabbit IgG, HRP-linked Antibody, Cell Signaling, 7074S Anti-mouse secondary antibody: HRP-conjugated goat anti-mouse IgG, EpiZyme, LF101

ECL chemiluminescence kit: Beyotime Biotechnology, P0018AM

| Antibody Name | Manufacturer | Catalog Number |
|---|---|---|
| Anti-CRBN antibody | Sigma | HPA045910 |
| Anti-eRF3/GSPT1 antibody | Abcam | ab49878 |
| Wee1 (D10D2) Rabbit mAb | Cell Signaling | 13084S |
| Rabbit Anti-Casein Kinase 1 alpha antibody | Abcam | ab108296 |
| Monoclonal ANTI-FLAG(R) M2 antibody | Sigma | F3165 |
| Anti-HA antibody | Sigma | H6908 |
| GAPDH (6C5) | Santa Cruz | sc-32233 |
| Monoclonal Anti-Vinculin antibody | Sigma | V9131 |

Electrophoresis buffer: 3.0275 g of Tris, 14.4135 g of Glycine, and 1 g of SDS were weighed out and vortexed for even mixing, and ddH$_2$O was added to make up to a constant volume of 1 L.

Transfer buffer: 3.03 g of Tris, 14.42 g of Glycine, and 100 mL of methanol were weighed out and vortexed for even mixing, and ddH$_2$O was added to make up to a constant volume of 1 L.

TBST: 6.057 g of Tris, 8.75 g of NaCl, and 2 mL of Tween20 were weighed out and vortexed for even mixing, and ddH$_2$O was added to make up to a constant volume of 1 L. Hydrochloric acid was added to adjust the pH to 8.0.

5% skim milk: 5 g of skim milk powder was weighed out and dissolved in 100 mL of TBST, and the mixture was vortexed for even mixing.

5% BSA: 5 g of BSA was weighed out and dissolved in 100 mL of TBST, and the mixture was vortexed for even mixing.

Cell Origin

| Cell | Origin |
|---|---|
| 293T | Thermo Fisherscientific |
| Other cells | ATCC (American Type Culture Collection) |

The specific screening results are shown in FIG. 28 and FIG. 29.

Conclusion: WX106, WX002, WX003, WX004, WX005, and WX006 all have a pro-degradation effect on Wee1; of which, the effect of WX106 is the strongest.

The invention claimed is:

1. A compound of formula (II) or a pharmaceutically acceptable salt thereof,

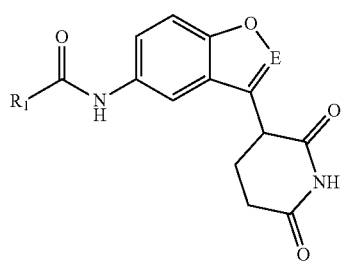

(II)

wherein,

E is selected from CH and N;

$R_1$ is selected from $C_{1-4}$ alkyl, $C_{2-3}$ alkenyl,

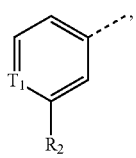

cyclopropyl and furyl, wherein the $C_{1-4}$ alkyl and $C_{2-3}$ alkenyl may be optionally substituted with 1, 2, or 3 $R_a$;

$T_1$ is selected from $C(R_3)$ and N;

$R_2$ is selected from H, F, Cl, Br, I, $CH_3$ and $CF_3$;

$R_3$ is selected from H, F, Cl, Br, I and $CH_3$, wherein the $CH_3$ may be optionally substituted with 1, 2 or 3 halogen;

each $R_a$ is selected from halogen, $OCH_3$, and $NH_2$.

2. The compound according to claim 1 or a pharmaceutically acceptable salt thereof, wherein $R_2$ is selected from H, Cl, and $CF_3$.

3. The compound according to claim 2 or a pharmaceutically acceptable salt thereof, wherein $R_2$ is Cl.

4. The compound according to claim 1 or a pharmaceutically acceptable salt thereof, wherein $R_3$ is selected from H, F, Cl, Br, I, and $CH_3$, and wherein $CH_3$ may be optionally substituted with 1, 2, or 3 F.

5. The compound according to claim 4 or a pharmaceutically acceptable salt thereof, wherein $R_3$ is selected from H, F, Cl, Br, I, and $CH_3$.

6. The compound according to claim 5 or a pharmaceutically acceptable salt thereof, wherein $R_3$ is H or $CH_3$.

7. The compound according to claim 1 or a pharmaceutically acceptable salt thereof, wherein $R_1$ is selected from

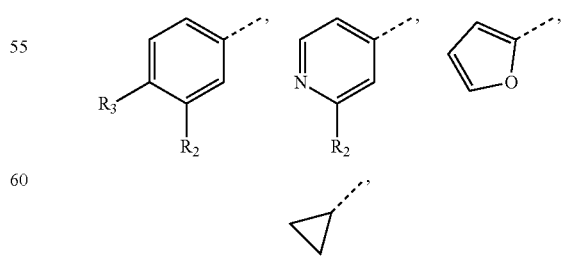

$CH=CH_2$, $CH_3$, $CH_2CH_3$, and $CH_2CH_2CH_3$, and wherein the $CH_3$, $CH_2CH_3$, and $CH_2CH_2CH_3$ may be optionally substituted with 1, 2, or 3 $R_a$.

8. The compound according to claim 7 or a pharmaceutically acceptable salt thereof, wherein $R_1$ is selected from

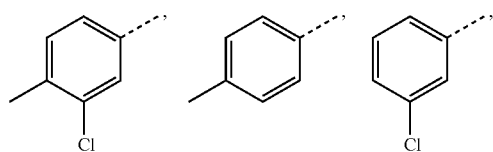

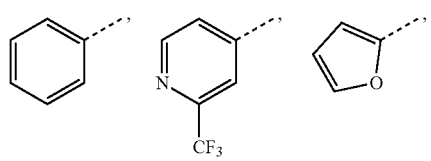

—CH=CH₂, —CH₂NH₂, —CH₂CH₃, —CH₂CH₂OCH₃, and —CH₂CH₂CH₃.

9. The compound according to claim 1 or a pharmaceutically acceptable salt thereof, which is selected from

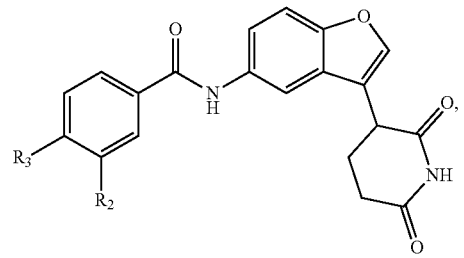
(I-1)

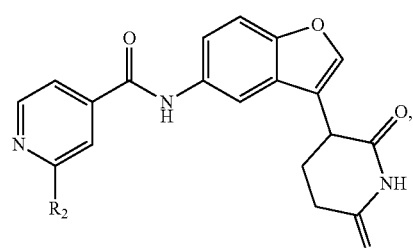
(I-2)

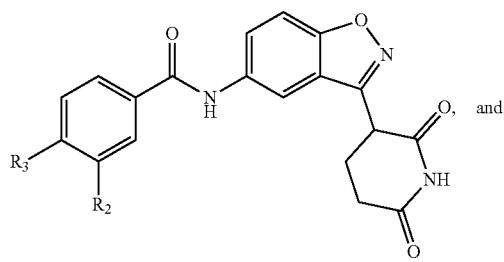
(II-1)

-continued

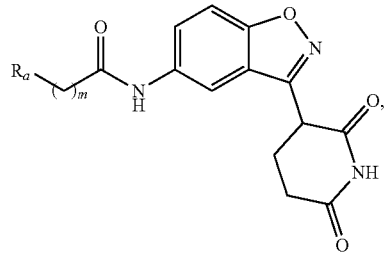
(II-2)

wherein, m is selected from 1, 2, and 3.

10. A compound or a pharmaceutically acceptable salt thereof, which is selected from

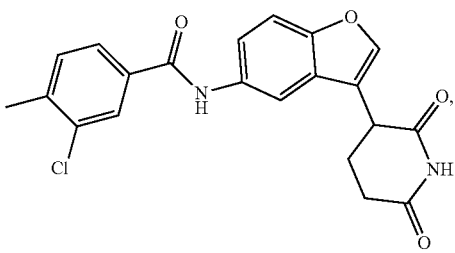

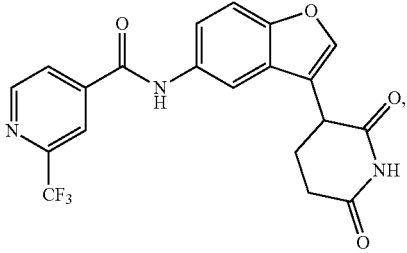

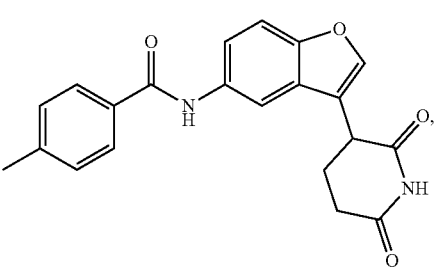

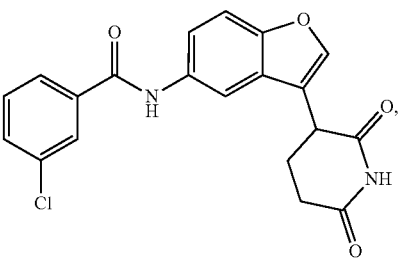

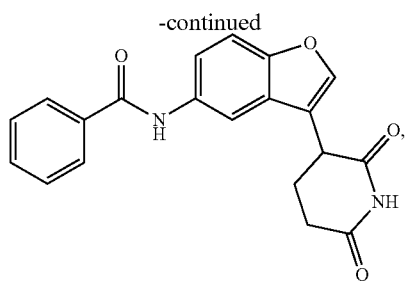
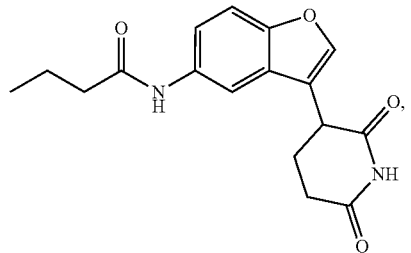
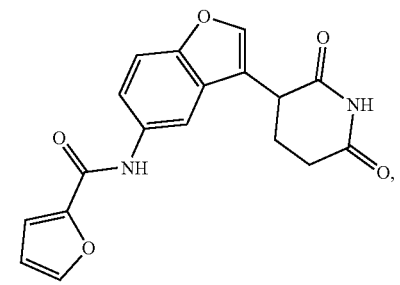
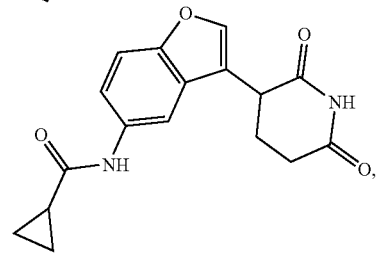
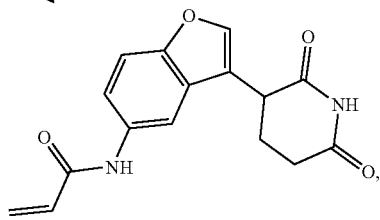
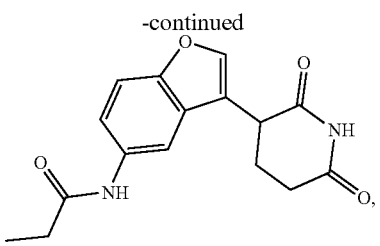
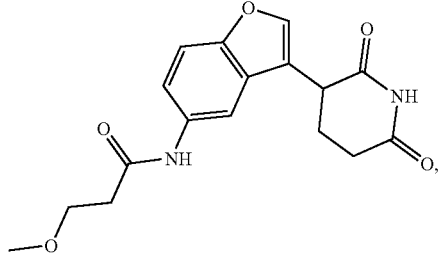
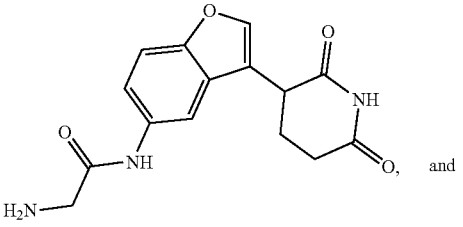
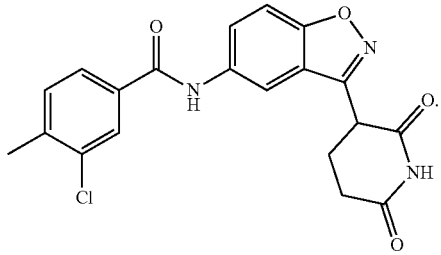 [SMILES: Cc1ccc(C(=O)Nc2ccc3onc(C4CCC(=O)NC4=O)c3c2)cc1Cl]
11. A pharmaceutical composition comprising the compound according to claim 1 or a pharmaceutically acceptable salt thereof and a pharmaceutically acceptable carrier.
* * * * *

SEQUENCE LISTING

```
<160> NUMBER OF SEQ ID NOS: 6

<210> SEQ ID NO 1
<211> LENGTH: 25
<212> TYPE: DNA
<213> ORGANISM: Artificial Sequence
<220> FEATURE:
<223> OTHER INFORMATION: Nucleotide sequence encoding guide RNA

<400> SEQUENCE: 1
caccggtcct gctgatctcc ttcgc                                        25

<210> SEQ ID NO 2
<211> LENGTH: 25
<212> TYPE: DNA
<213> ORGANISM: Artificial Sequence
<220> FEATURE:
<223> OTHER INFORMATION: Nucleotide sequence encoding guide RNA

<400> SEQUENCE: 2
aaacgcgaag gagatcagca ggacc                                        25

<210> SEQ ID NO 3
<211> LENGTH: 25
<212> TYPE: DNA
<213> ORGANISM: Artificial Sequence
<220> FEATURE:
<223> OTHER INFORMATION: Nucleotide sequence encoding guide RNA

<400> SEQUENCE: 3
caccgatagt acctaggtgc tgata                                        25
```

```
<210> SEQ ID NO 4
<211> LENGTH: 25
<212> TYPE: DNA
<213> ORGANISM: Artificial Sequence
<220> FEATURE:
<223> OTHER INFORMATION: Nucleotide sequence encoding guide RNA

<400> SEQUENCE: 4
aaactatcag cacctaggta ctatc                                          25

<210> SEQ ID NO 5
<211> LENGTH: 25
<212> TYPE: DNA
<213> ORGANISM: Artificial Sequence
<220> FEATURE:
<223> OTHER INFORMATION: Nucleotide sequence encoding guide RNA

<400> SEQUENCE: 5
caccgcgcac catactgact tcttg                                          25

<210> SEQ ID NO 6
<211> LENGTH: 25
<212> TYPE: DNA
<213> ORGANISM: Artificial Sequence
<220> FEATURE:
<223> OTHER INFORMATION: Nucleotide sequence encoding guide RNA

<400> SEQUENCE: 6
aaaccaagaa gtcagtatgg tgcgc                                          25
```